United States Patent
Zhang et al.

(10) Patent No.: US 12,398,243 B2
(45) Date of Patent: Aug. 26, 2025

(54) BLOCK POLYMER COMPOSITE MEMBRANES

(71) Applicants: University of Notre Dame du Lac, South Bend, IN (US); Purdue Research Foundation, West Lafayette, IN (US)

(72) Inventors: Yizhou Zhang, South Bend, IN (US); William A. Phillip, South Bend, IN (US); Matthew J. Webber, South Bend, IN (US); Bryan W. Boudouris, West Lafayette, IN (US)

(73) Assignees: UNIVERSITY OF NOTRE DAME DU LAC, South Bend, IN (US); PURDUE RESEARCH FOUNDATION, West Lafayette, IN (US)

( * ) Notice: Subject to any disclaimer, the term of this patent is extended or adjusted under 35 U.S.C. 154(b) by 1004 days.

(21) Appl. No.: 17/289,647

(22) PCT Filed: Oct. 30, 2019

(86) PCT No.: PCT/US2019/058918
§ 371 (c)(1),
(2) Date: Apr. 28, 2021

(87) PCT Pub. No.: WO2020/092612
PCT Pub. Date: May 7, 2020

(65) Prior Publication Data
US 2022/0002497 A1    Jan. 6, 2022

Related U.S. Application Data

(60) Provisional application No. 62/752,482, filed on Oct. 30, 2018.

(51) Int. Cl.
*C08G 81/02* (2006.01)
*B01D 67/00* (2006.01)
(Continued)

(52) U.S. Cl.
CPC ...... *C08G 81/024* (2013.01); *B01D 67/00111* (2022.08); *B01D 67/0013* (2013.01);
(Continued)

(58) Field of Classification Search
CPC .......... B01D 67/00111; B01D 67/0013; B01D 67/00931; B01D 69/02; B01D 69/12;
(Continued)

(56) References Cited

U.S. PATENT DOCUMENTS

| | | | |
|---|---|---|---|
| 5,919,442 A | 7/1999 | Yin et al. | |
| 10,022,679 B2 | 7/2018 | Phillip et al. | |
| 2016/0023171 A1 | 1/2016 | Phillip et al. | |

OTHER PUBLICATIONS

Luo, et al., "pH-responsive poly(ether sulfone) composite membranes blended with amphiphilic polystyrene-block-poly(acrylic acid) copolymers," Journal of Membrane Science, 450:162-173 (Year: 2014).*

(Continued)

*Primary Examiner* — Patrick Orme
(74) *Attorney, Agent, or Firm* — Haukaas Fortius PLLC; Michael Haukaas

(57) ABSTRACT

A highly permeable sorbent platform based on polysulfone and polystyrene-b-poly(acrylic acid) composite membranes. The membranes possess a fully interconnected network of poly(acrylic acid)-lined pores, which enables the surface chemistry to be tailored through sequential attachment of polyethyleneimine moieties and metal-binding terpyridine ligands. The polyethyleneimine moieties increase the saturation capacity, while the addition of terpyridine enables high-affinity binding to a diversity of transition metal ions. This membrane platform removes such metal contaminants (Continued)

from solution. The metal capture performance of the functionalized membranes persists even in high concentrations of competitive ions. Also, fluorescence quenching of the terpyridine moiety upon metal ion complexation offers an in-situ probe to monitor the extent of sorbent saturation. The permeability, capacity, and affinity of these membranes, with high-density display of a metal-binding ligand, offer a chemically tailored platform to address the challenges that arise in ensuring clean water.

10 Claims, 29 Drawing Sheets

(51) Int. Cl.
| | |
|---|---|
| B01D 69/02 | (2006.01) |
| B01D 69/12 | (2006.01) |
| B01D 69/14 | (2006.01) |
| B01D 71/40 | (2006.01) |
| B01D 71/60 | (2006.01) |
| B01D 71/68 | (2006.01) |
| B01D 71/80 | (2006.01) |
| B01J 39/04 | (2017.01) |
| B01J 39/19 | (2017.01) |
| B01J 47/12 | (2017.01) |
| C02F 1/44 | (2023.01) |
| C02F 101/20 | (2006.01) |
| C08J 5/22 | (2006.01) |

(52) U.S. Cl.
CPC ....... *B01D 67/00931* (2022.08); *B01D 69/02* (2013.01); *B01D 69/12* (2013.01); *B01D 69/147* (2013.01); *B01D 71/40* (2013.01); *B01D 71/601* (2022.08); *B01D 71/68* (2013.01); *B01D 71/80* (2013.01); *B01J 39/04* (2013.01); *B01J 39/19* (2017.01); *B01J 47/12* (2013.01); *C02F 1/44* (2013.01); *C08J 5/2268* (2013.01); *C08J 5/2287* (2013.01); *B01D 2325/0283* (2022.08); *B01D 2325/34* (2013.01); *C02F 2101/20* (2013.01)

(58) Field of Classification Search
CPC .......... B01D 69/147; B01D 2325/0283; B01D 2325/34; B01J 39/04; B01J 39/19; B01J 47/12; C02F 1/44; C02F 2101/20; C08G 81/024; C08J 5/2268; C08J 5/2287
See application file for complete search history.

(56) References Cited

OTHER PUBLICATIONS

Zhu, et al., "Symmetrical polysulfone/poly(acrylic acid) porous membranes with uniform wormlike morphology and pH responsibility: Preparation, characterization and application in water purification," Journal of Membrane Science, 549:515-522 (Year: 2018).*
Wu, et al., "Amphiphilic PMMA/PEI core-shell nanoparticles as polymeric adsorbents to remove heavy metal pollutants," Colloids and Surfaces A: Physicochemical and Engineering Aspects, 384:180-18 (Year: 2011).*
Suh, et al., "Catalytic Activity of Ni(II)-Terpyridine Complex in Phosphodiester Transesterification Remarkably Enhanced by Self-Assembly of Terpyridines on Poly(ethylenimine)," Journal of the American Chemical Society, 120:12545-12552 (Year: 1998).*
Ali, et al., "Metal Ion Affinity-based Biomolecular Recognition and Conjugation inside Synthetic Polymer Nanopores Modified with Iron-Terpyridine Complexes," Journal of the American Chemical Society, 133:17307-17314 (Year: 2011).*
Ali et al., "Metal Ion Affinity-based Biomolecular Recognition and Conjugation inside Synthetic Polymer Nanopores Modified with Iron-Terpyridine Complexes," J Am Chem Soc., 133(43):17307-17314, Sep. 2011.
Arya, R., "Drying Induced Phase Separation," J Chem Eng., 27(1):12-20, Jun. 2012.
Chitpong et al., "Nanofiber Ion-Exchange Membranes for the Rapid Uptake and Recovery of Heavy Metals from Water," Membranes (Basel), 6(4):1-16, Dec. 2016.
Hochwimmer et al., "6,6'-Bisfunctionalized 2,2'-Bipyridines as Metallo-Supramolecular Initiators for the Living Polymerization of Oxazolines," Macromol Rapid Commun., 19:309-313, Jan. 1998.
International Search Report and Written Opinion of the ISA/US in PCT/US2019/058918, dated Jan. 17, 2020; 9pgs.
Luo et al., "pH-Responsive Poly(ether Sulfone) Composite Membranes Blended with Amphiphilic Polystyrene-Block-Poly(acrylic Acid) Copolymers," J Membrane Sci., 450:162-173, Jan. 2014.
Park et al., "Polysulfone-Graft-Poly(ethylene Glycol) Graft Copolymers for Surface Modification of Polysulfone Membranes," Biomaterials, 27(6):856-865, Feb. 2006.
Siebert et al., "CMOSFluorescence Quenching in Zn2+-Bis-Terpyridine Coordination Polymers: A Single Molecule Study," J Mater Chem., 22(31):16041-16050, Aug. 2012.
Suh et al., "Catalytic Activity of Ni(II)-Terpyridine Complex in Phosphodiester Transesterification Remarkably Enhanced by Self-Assembly of Terpyridines on Poly( ethylenimine)," J Am Chem Soc., 120(8):12545-12552, Dec. 1998.
Sun et al., "Rapid, Selective Heavy Metal Removal from Water by a Metal-Organic Framework/Polydopamine Composite," ACS Cent. Sci., 8(4):349-356, Mar. 2018.
Weidman et al., "Nanoporous Block Polymer Thin Films Functionalized with Bio-Inspired Ligands for the Efficient Capture of Heavy Metal Ions from Water," ACS Appl Mater Interfaces, 9(22):19152-19160, May 2017.
Weidman et al., "Unusually Stable Hysteresis in the pH-Response of Poly(Acrylic Acid) Brushes Confined within Nanoporous Block Polymer Thin Films," J. Am. Chem. Soc., 138(22):7030-7039, May 2016.
Weidmann et al., "Nanostructured Membranes from Triblock Polymer Precursors as High Capacity Copper Adsorbents," Langmuir, 31(40):11113-11123, Sep. 2015.
Wu e tal., "Amphiphilic PMMA/PEI Core-Shell Nanoparticles as Polymeric Adsorbents to Remove Heavy Metal Pollutants," Colloids Surf, A Physicochem Eng Asp., 384(1-3):180-185, Jul. 2011.
Zhang et al., "Block Polymer Membranes Functionalized with Nanoconfined Polyelectrolyte Brushes Achieve Sub-Nanometer Selectivity," ACS Macro Lett., 6(7):726-732, Jun. 2017.
Zhu et al., "Symmetrical Polysulfone/ Poly(acrylic Acid) Porous Membranes with Uniform Wormlike Morphology and pH Responsibility: Preparation, Characterization and Application in Water Purification," J Membrane Sci., 549:515-522, Mar. 2018.

* cited by examiner

BLOCK POLYMER COMPOSITE MEMBRANES

RELATED APPLICATIONS

This application is a National Stage filing under 35 U.S.C. § 371 of International Application No. PCT/US2019/058918 filed Oct. 30, 2019, which claims priority under 35 U.S.C. § 119 (e) to U.S. Provisional Patent Application Ser. No. 62/752,482, filed Oct. 30, 2018, which applications are incorporated herein by reference.

GOVERNMENT SUPPORT

This invention was made with government support under Grant No. 1511835 awarded by the National Science Foundation and Grant No. W911NF-14-1-0229 awarded by the Army Research Office. The government has certain rights in the invention.

BACKGROUND OF THE INVENTION

Accelerating urbanization, expanding mining operations, and aging infrastructure have led to growing concern regarding heavy metal contamination in fresh water supplies. Treatment processes specializing in heavy metal remediation can be broadly categorized into chemical precipitation, biocatalytic processes, size-selective membrane separations, or adsorptive separations. Size-selective membrane separations, such as reverse osmosis (RO) and nanofiltration (NF), remove dissolved metal ions by sterically restraining the hydrated ions, whose size is larger than that of water molecules, from passing through a thin selective barrier. This approach can achieve exceptionally high purity in the permeate water. However, such purity is possible at the expense of substantial energy demands that result from the large transmembrane pressure drops needed to overcome the osmotic pressure of the feed solution. Additionally, the management of the heavy metal enriched concentrate is a significant challenge because further evaporation and crystallization is required to minimize the volume of this waste prior to its disposal. Even then, there are concerns that the metal ions may leach from the disposal site and return as an environmental contaminant.

Adsorption-based processes offer the ability to efficiently capture dissolved metals using ligands that sequester metal ions on the sorbent surface through a variety of chemical interactions. Conventional adsorption operations utilize packed beds filled with microporous beads of resin that are 100-500 μm in diameter. While these beads provide large saturation capacities, their relatively large diameter and the associated mass transfer resistance result in an inefficient use of the available binding sites. Adsorptive membranes, based on porous templates (e.g., pore diameters, $d_p$~10-1000 nm), direct flow through the porous matrix and offer shorter diffusion distances between the solutes and the binding moieties on the sorbent surface. This configuration reduces mass transfer resistances and, consequently, affords higher throughput operation while utilizing available binding sites more efficiently. However, despite the advantageous mass transfer associated with membranes, the performance of many state-of-the-art adsorptive membranes is hindered by low binding affinities and limited saturation capacities. To overcome these challenges, the design of an ideal sorbent would have a high density of binding sites with high equilibrium binding constants for transition metal ions to enable non-specific heavy metal removal. Moreover, it should operate at low hydraulic pressures with high throughput and afford reuse through binding site regeneration using external stimuli.

Previous studies that have targeted membrane adsorbers for metal ion remediation have addressed the issue of low saturation capacity by attaching a high density of binding sites on the membrane surface. For example, poly(glycidyl methacrylate)-lined cellulose nanofiber membranes were further functionalized with poly(acrylic acid) (PAA) brushes via an epoxide ring opening reaction. The resulting films achieved a high cadmium ($Cd^{2+}$) saturation capacity of 1.4 mmol $g^{-1}$ and a hydraulic permeability value of ~1,000 L $m^{-2}$ $h^{-1}$ $bar^{-1}$. In another approach, the pore walls of a mesoporous membrane fabricated from a self-assembled polyisoprene-b-polystyrene-b-poly(N,N-dimethylacrylamide) block polymer were converted to PAA moieties, providing the membrane with a high copper ($Cu^{2+}$) saturation capacity of 4.1 mmol $g^{-1}$, an equilibrium binding constant 200 $M^{-1}$, and a $Cu^{2+}$ to nickel ($Ni^{2+}$) selectivity of 10. Though membranes in these prior studies demonstrated large saturation capacities for individual heavy metals under ideal conditions, these membranes had limited binding affinity due to the use of ligands with only modest ability to coordinate metal ions. Furthermore, heavy metal contamination is frequently only a component of a more complex solution, and adsorptive membranes typically display a lower binding capacity in the presence of competitive background electrolytes due to precluded access to available binding sites. Therefore, it is crucial to develop a membrane adsorber with high-affinity ligands that efficiently capture many heavy metal contaminants in the presence of competing ions.

In addition to tailoring binding to improve sorbent performance, adsorption processes would benefit from enhanced in situ monitoring and process control. For example, in reverse osmosis processes, it has been demonstrated that the intensity of fluorescent tracers such as rhodamine-WT or uranine could be utilized as a reliable means to monitor the integrity of the membranes while in operation. In adsorptive processes, data on the saturation of the sorbent would inform decisions regarding process regeneration or replacement. While prior studies have remarked on the tendency of transition metals to quench the fluorescence of some binding ligands upon complexation, little work has been devoted to the development of such a capability in membrane adsorbers due to limited chemistries available for the attachment of an appropriate fluorescent ligand.

Thus, current membrane-based sorbents suffer from low binding affinities, leading to issues when contaminants are present at trace concentrations or when the source waters have a high concentration of background electrolytes that compete for open binding sites. Adsorptive membranes could provide a solution to the challenge of removing and recovering heavy metal ion contaminants and resources from water supplies. However, a solution is needed to meet the design challenge of such an adsorptive membrane, which requires deliberate selection of membrane templates for advantageous transport performance, as well as binding ligand chemistry with observable characteristics that change as a function of metal binding.

SUMMARY

This disclosure provides the design of a highly permeable (i.e., permeability of ~2.8×10$^4$ L $m^{-2}$ $h^{-1}$ $bar^{-1}$) sorbent platform based on polysulfone and polystyrene-b-poly (acrylic acid) composite membranes. The membranes possess a fully interconnected network of poly(acrylic acid)-lined pores, which enables the surface chemistry to be tailored through sequential attachment of polyethyleneimine brushes and metal-binding terpyridine ligands.

The polyethyleneimine brushes increase the saturation capacity, while the addition of terpyridine enables high-affinity binding to a diversity of transition metal ions (i.e., $Pd^{2+}$, $Cd^{2+}$, $Hg^{2+}$, $Pb^{2+}$, $Zn^{2+}$, $Co^{2+}$, $Ni^{2+}$, $Fe^{2+}$, $Nd^{3+}$ and $Sm^{3+}$). This membrane platform removes these metal contaminants from solution with a sorbent capacity of 1.2 mmol $g^{-1}$ [based on $Cu^{2+}$ uptake]. The metal capture performance of the functionalized membranes persists in spite of high concentrations of competitive ions, with >99% removal of $Pb^{2+}$ and $Cd^{2+}$ ions from artificial groundwater and seawater solutions. Also, fluorescence quenching of the terpyridine moiety upon metal ion complexation offers an in situ probe to monitor the extent of sorbent saturation with a Stern-Volmer association constant of $2.9 \times 10^4$ L $mol^{-1}$. The permeability, capacity, and affinity of these membranes, with high-density display of a metal-binding ligand, offer a chemically tailored platform to address the challenges that arise in ensuring clean water.

Accordingly, this disclosure provides a composite membrane comprising a polysulfone (Psf) and a polystyrene-b-poly(acryloyl) diblock copolymer (PS-PAX), wherein the weight ratio of Psf to PS-PAX is greater than 2 to 1 and less than 6 to 1;
  wherein the membrane has a network of interconnecting pores and pore openings at the surface of the membrane, the pores comprise polymer chains extending from the inner surface of the pores into the lumen of the pores, the chains comprise a segregated poly(acryloyl) moiety of the diblock copolymer, and the moiety comprises a plurality of metal ion binding groups; and
  wherein the diameters of the pore openings are less than about 5000 nm and the membrane has a metal ion maximum binding capacity (Q) of at least 0.4 mmol/g.

This disclosure also provides a method for fabricating a composite membrane comprising:
  a) contacting a polysulfone (Psf) and a polystyrene-b-poly(acrylic acid) diblock copolymer (PS-PAA) in an organic solvent to form a casting solution;
  b) casting a film of the solution onto a substrate;
  c) exposing the film to humidity for a sufficient amount of time to induce phase separation; and
  d) annealing the film in water;
  wherein the membrane has a network of interconnecting pores and pore openings at the surface of the membrane, the pores comprise polymer chains extending from the inner surface of the pores into the lumen of the pores and pore openings;
  wherein the chains comprise a segregated poly(acrylic acid) moiety of the diblock copolymer; thereby fabricating the composite membrane.

Additionally, this disclosure provides a method to capture transition metal ions comprising contacting one or more composite membranes disclosed herein and an aqueous solution comprising one or more dissolved transition metal ions;
  wherein the chains of the composite membrane bind the dissolved transition metal ions, and the chains have a metal ion maximum binding capacity (Q) of about 0.4 mmol/g to about 5 mmol/g; thereby capturing the one or more dissolved transition metal ions.

The invention provides novel compositions of Formulas I-III, intermediates for the preparation of compositions of Formulas I-III, as well as methods of preparing compositions of Formulas I-III. The invention also provides compositions of Formulas I-III that are useful as intermediates for the preparation of other useful compositions. The invention provides for the use of compositions of Formulas I-III for the manufacture of membranes useful for purification of water.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1A:
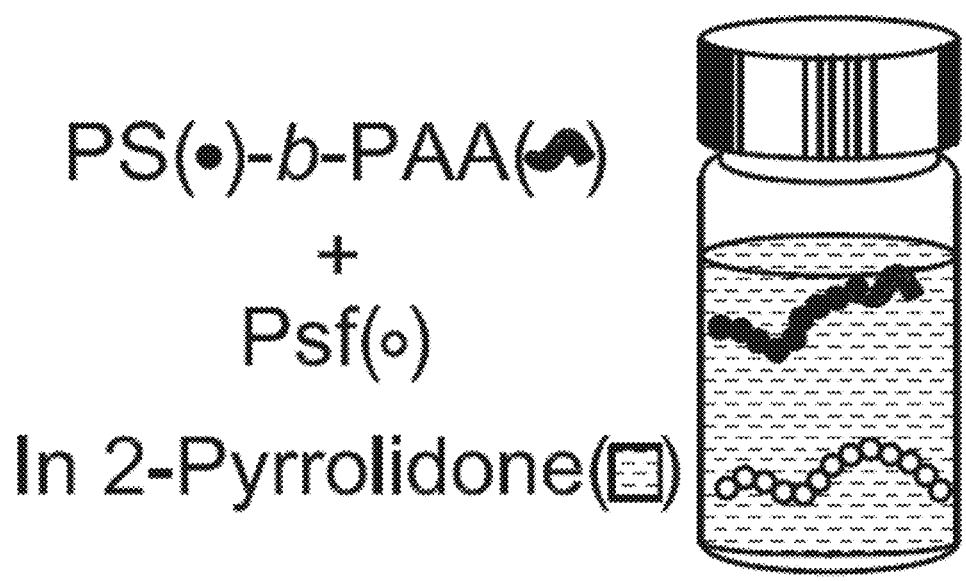
FIG. 1. Schematic of the surface-segregation and vapor induced phase separation (SVIPS) membrane fabrication process. (a) The polymer solution was prepared by dissolving the polysulfone (Psf) and PS-b-PAA in 2-pyrrolidone. (b) The polymer solution was drawn into a uniform thin film on a glass substrate. (c) The casting solution thin film was exposed in a humid environment (with a relative humidity ~95%) for a pre-determined amount of time. The intrusion of water vapor from the humid air into the casting solution contributes to the formation of a uniform cross-sectional architecture comprised of spongy cells. (d) The film was subsequently plunged into a non-solvent water bath that caused the hydrophobic polymers to precipitate and vitrify the membrane nanostructure. Simultaneously, due to their hydrophilic nature, the PAA brushes preferentially segregate toward the surface of the pore wall. (e) The composite membrane was annealed in a bath of DI water at 80° C. to allow the PAA brushes to extend toward the center of the pore.
Figure 1B:
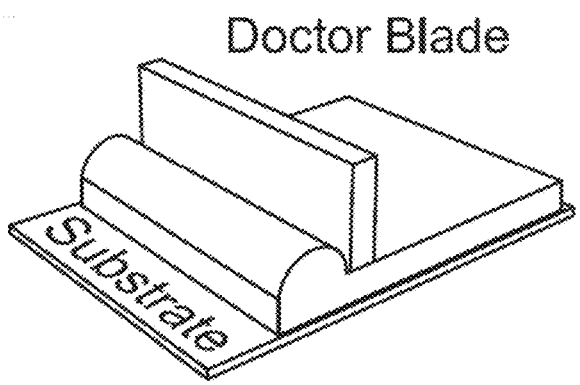
Figure 1C:
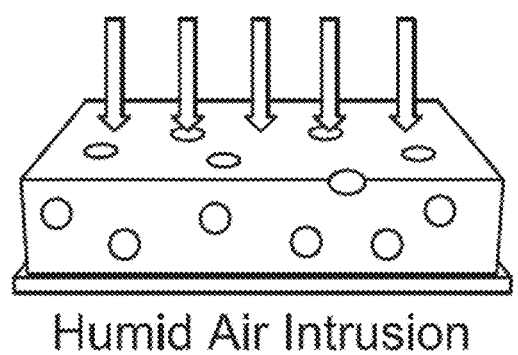
Figure 1D:
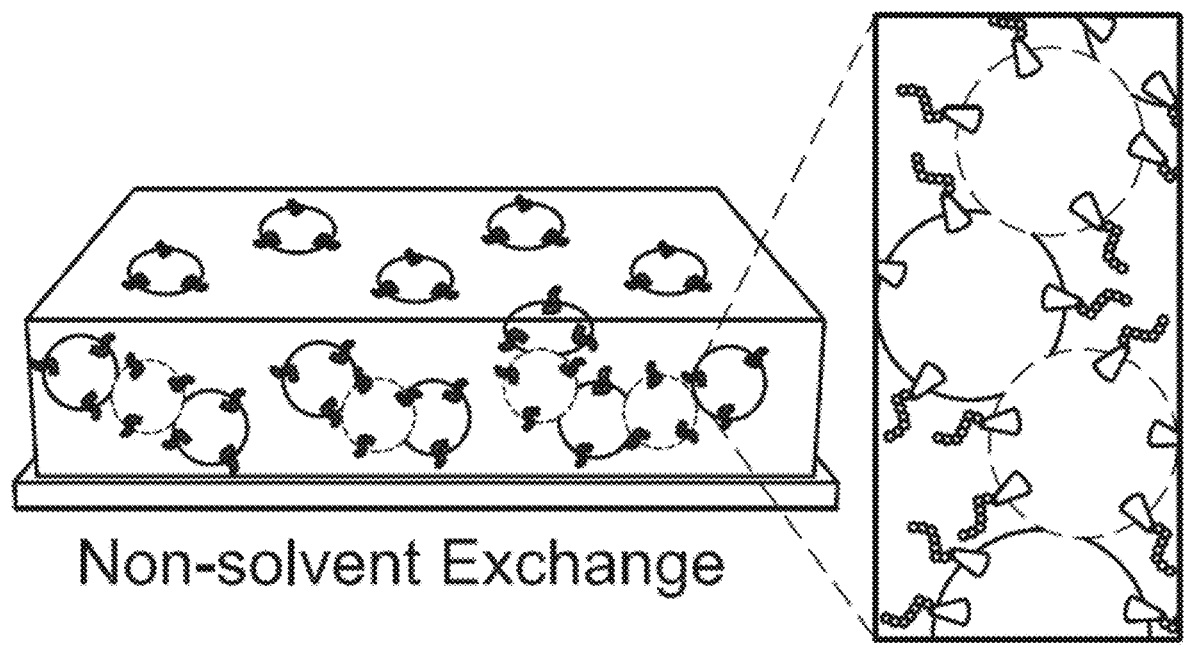
Figure 1E:
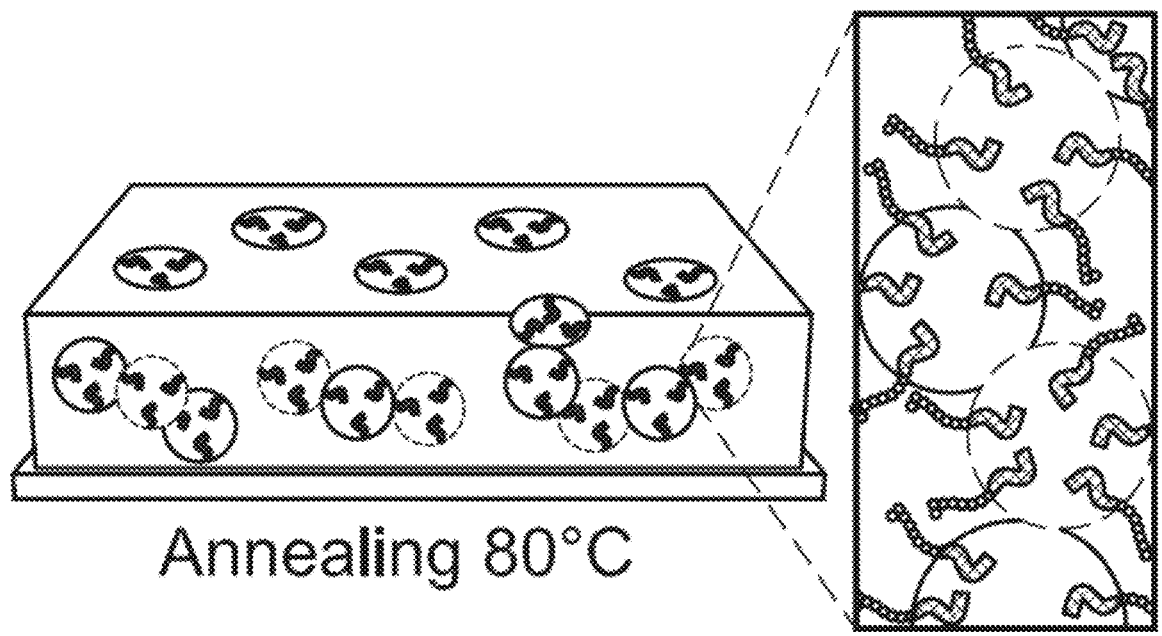

This disclosure addresses the challenges in the development of membrane adsorbers through a bottom-up design approach to fabricate a polysulfone (Psf) block polymer composite membrane template that can be further tailored to enhance binding affinity and expand sorbent functionality. A PAA-lined membrane with a fully interconnected bicontinuous network consisting of pores ~1 μm in diameter was prepared through the use of surface segregation and vapor induced phase separation (SVIPS) methodology. Then, through facile coupling reactions, the pore wall was chemically tailored to attach heavy metal binding groups, which increased binding capacity and enhanced the sorbent affinity for a diversity of transition metal ions. Specifically, terpyridine (TerP) moieties with innate fluorescence were introduced through a polyethyleneimine (PEI) intermediate. This route additionally turned the membrane into a sensitive heavy metal probe and demonstrates that the appropriate choice of pore wall chemistry can target multiple design criteria simultaneously. The Psf block polymer composite serves as the foundation for a variety of affinity or adsorption-based separations with potential in situ saturation monitoring capability. Furthermore, the surface-segregated pore wall functional group can be tailored according to the specific demands of targeted applications, such as biomolecular recognition, or trace metal mining from sea water.

Through molecular design of the sorbent and ligand chemistries, as described herein, it is possible to leverage the quenched fluorescence of the metal-ligand complex to provide real-time detection of the saturation of the membrane adsorber as well as an accurate representation of the local concentration of the heavy metal.

Definitions

The following definitions are included to provide a clear and consistent understanding of the specification and claims.

As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the endpoints of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, or in a reaction mixture.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

This disclosure provides methods of making the compounds and compositions of the invention. The compounds and compositions can be prepared by any of the applicable techniques described herein, optionally in combination with standard techniques of organic synthesis. Many techniques such as etherification and esterification are well known in the art. However, many of these techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6; as well as standard organic reference texts such as March's Advanced Organic Chemistry: Reactions, Mechanisms, and Structure, 5th Ed., by M. B. Smith and J. March (John Wiley & Sons, New York, 2001); Comprehensive Organic Synthesis. Selectivity, Strategy & Efficiency in Modern Organic Chemistry. In 9 Volumes, Barry M. Trost, Editor-in-Chief (Pergamon Press, New York, 1993 printing); Advanced Organic Chemistry, Part B: Reactions and Synthesis, Second Edition, Cary and Sundberg (1983);

The formulas and compounds described herein can be modified using protecting groups. Suitable amino and carboxy protecting groups are known to those skilled in the art (see for example, Protecting Groups in Organic Synthesis, Second Edition, Greene, T. W., and Wutz, P. G. M., John Wiley & Sons, New York, and references cited therein; Philip J. Kocienski; Protecting Groups (Georg Thieme Verlag Stuttgart, New York, 1994), and references cited therein); and Comprehensive Organic Transformations, Larock, R. C., Second Edition, John Wiley & Sons, New York (1999), and referenced cited therein.

As used herein, the term "substituted" or "substituent" is intended to indicate that one or more (for example, 1-20 in various embodiments, 1-10 in other embodiments, 1, 2, 3, 4, or 5; in some embodiments 1, 2, or 3; and in other embodiments 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound. Suitable indicated groups include, e.g., alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfinyl, alkylsulfonyl, and cyano.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms. As used herein, the term "alkyl" also encompasses a "cycloalkyl", defined below. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group can include both alkenyl and alkynyl groups. The alkyl can be a monovalent hydrocarbon radical, as described and exemplified above, or it can be a divalent hydrocarbon radical (i.e., an alkylene).

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted. The cycloalkyl group can be monovalent or divalent and can be optionally substituted as described for alkyl groups. The cycloalkyl group can optionally include one or more cites of unsaturation, for example, the cycloalkyl group can include one or more carbon-carbon double bonds, such as, for example, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, and the like.

The term "heterocycloalkyl" refers to a saturated or partially saturated monocyclic, bicyclic, or polycyclic ring containing at least one heteroatom selected from nitrogen, sulfur, oxygen, preferably from 1 to 3 heteroatoms in at least one ring. Each ring is preferably from 3 to 10 membered, more preferably 4 to 7 membered. Examples of suitable heterocycloalkyl substituents include pyrrolidyl, tetrahydrofuryl, tetrahydrothiofuranyl, piperidyl, piperazyl, tetrahydropyranyl, morpholino, 1,3-diazapane, 1,4-diazapane, 1,4-oxazepane, and 1,4-oxathiapane. The group may be a terminal group or a bridging group.

The term "aromatic" refers to either an aryl or heteroaryl group or substituent described herein. Additionally, an aromatic moiety may be a bisaromatic moiety, a trisaromatic moiety, and so on. A bisaromatic moiety has a single bond between two aromatic moieties such as, but not limited to, biphenyl, or bipyridine. Similarly, a trisaromatic moiety has a single bond between each aromatic moiety.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 30 carbon atoms, for example, about 6-10 carbon atoms. In other embodiments, the aryl group can have 6 to 60 carbons atoms, 6 to 120 carbon atoms, or 6 to 240 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted.

The term "heteroaryl" refers to a monocyclic, bicyclic, or tricyclic ring system containing one, two, or three aromatic rings and containing at least one nitrogen, oxygen, or sulfur atom in an aromatic ring. The heteroaryl can be unsubstituted or substituted, for example, with one or more, and in particular one to three, substituents, as described in the definition of "substituted". Typical heteroaryl groups contain 2-20 carbon atoms in the ring skeleton in addition to the one or more heteroatoms. Examples of heteroaryl groups include, but are not limited to, 2H-pyrrolyl, 3H-indolyl, 4H-quinolizinyl, acridinyl, benzo[b]thienyl, benzothiazolyl, β-carbolinyl, carbazolyl, chromenyl, cinnolinyl, dibenzo[b,d]furanyl, furazanyl, furyl, imidazolyl, imidizolyl, indazolyl, indolisinyl, indolyl, isobenzofuranyl, isoindolyl, isoquinolyl, isothiazolyl, isoxazolyl, naphthyridinyl, oxazolyl, perimidinyl, phenanthridinyl, phenanthrolinyl, phenarsazinyl, phenazinyl, phenothiazinyl, phenoxathiinyl, phenoxazinyl, phthalazinyl, pteridinyl, purinyl, pyranyl, pyrazinyl, pyrazolyl, pyridazinyl, pyridyl, pyrimidinyl, pyrrolyl, quinazolinyl, quinolyl, quinoxalinyl, thiadiazolyl, thianthrenyl, thiazolyl, thienyl, triazolyl, tetrazolyl, and xanthenyl. In one embodiment the term "heteroaryl" denotes a monocyclic aromatic ring containing five or six ring atoms containing carbon and 1, 2, 3, or 4 heteroatoms independently selected from non-peroxide oxygen, sulfur, and N(Z) wherein Z is absent or is H, O, alkyl, aryl, or ($C_1$-$C_6$)alkylaryl. In some embodiments, heteroaryl denotes an ortho-fused bicyclic heterocycle of about eight to ten ring atoms derived therefrom, particularly a benz-derivative or one derived by fusing a propylene, trimethylene, or tetramethylene diradical thereto.

A "solvent" as described herein can include water or an organic solvent. Examples of organic solvents include hydrocarbons such as toluene, xylene, hexane, and heptane; chlorinated solvents such as methylene chloride, chloroform, and dichloroethane; ethers such as diethyl ether, tetrahydrofuran, and dibutyl ether; ketones such as acetone and 2-butanone; esters such as ethyl acetate and butyl acetate; nitriles such as acetonitrile; alcohols such as methanol, ethanol, and tert-butanol; and aprotic polar solvents such as N,N-dimethylformamide (DMF), N,N-dimethylacetamide (DMA), and dimethyl sulfoxide (DMSO). Solvents may be used alone or two or more of them may be mixed for use to provide a "solvent system".

The phrase "one or more" is readily understood by one of skill in the art, particularly when read in context of its usage. For example, one or more substituents on a phenyl ring refers to one to five, or one to up to four, for example if the phenyl ring is disubstituted. One or more subunits (i.e., repeat units or blocks) of a polymer can refer to about 5 to about 100,000, or any number of subunits.

Substituents of the compounds and polymers described herein may be present to a recursive degree. In this context, "recursive substituent" means that a substituent may recite another instance of itself. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility or log P, application properties such as activity against the intended target, and practical properties such as ease of synthesis. Recursive substituents are an intended aspect of the invention. One of ordinary skill in the art of organic chemistry understands the versatility of such substituents. To the degree that recursive substituents are present in a claim of the invention, the total number in the repeating unit of a polymer example can be, for example, about 1-50, about 1-40, about 1-30, about 1-20, about 1-10, or about 1-5.

The term, "repeat unit", "repeating unit", or "block" as used herein refers to the moiety of a polymer that is repetitive. The repeat unit may comprise one or more repeat units, labeled as, for example, repeat unit A, repeat unit B, repeat unit C, etc. Repeat units A-C, for example, may be covalently bound together to form a combined repeat unit. Monomers or a combination of one or more different monomers can be combined to form a (combined) repeat unit of a polymer or copolymer.

The term "molecular weight" for the copolymers disclosed herein refers to the average number molecular weight ($M_n$). The corresponding weight average molecular weight (Mw) can be determined from other disclosed parameters by methods (e.g., by calculation) known to the skilled artisan.

In various embodiments, the ends of the copolymer (i.e., the initiator end or terminal end) can be in some embodiments a low molecular weight moiety (e.g. under 500 Da), such as, H, OH, OOH, $CH_2OH$, CN, $NH_2$, or a hydrocarbon such as an alkyl (for example, a butyl or 2-cyanoprop-2-yl moiety at the initiator and terminal end), alkene or alkyne, or a moiety as a result of an elimination reaction at the first and/or last repeat unit in the copolymer.

The term "segregated" as defined herein means the two blocks of the diblock copolymer are segregated, at least I part, in separate compartments of the composite membrane. The poly(acryloyl) moiety is the portion of the diblock copolymer that forms brushes (also referred to herein as moieties or polymer chains) because the brushed extend from the inner surface of the pores into the lumen of the pores, while the polystyrene moiety is the portion of the diblock copolymer that does not extend from the inner surface of the pores into the lumen of the pores and thus is localized away from the lumen/interior of the pores (e.g., the body of the membrane).

Embodiments of the Invention

This disclosure provides a composite membrane comprising a polysulfone (Psf) and a polystyrene-b-poly(acryloyl) diblock copolymer (PS-PAX), wherein the weight ratio of Psf to PS-PAX is greater than 2 to 1 and less than 6 to 1; wherein the membrane has a network of interconnecting pores and pore openings at the surface of the membrane, the pores comprise polymer chains (e.g., brushes) extending from the inner surface of the pores into the lumen of the pores, the chains comprise a segregated poly(acryloyl) moiety of the diblock copolymer, and the moiety comprises a plurality of metal ion binding groups; and wherein the diameters of the pore openings are less than about 5000 nm and the membrane has a metal ion maximum binding capacity (Q) of at least 0.4 mmol/g.

In various embodiments, at least one acryloyl group of the poly(acryloyl) moiety has an amide bond to a branched polyamine. In additional embodiments, the branched polyamine comprises polyethylenimine (PEI). In further embodiments, the branched polyamine is bonded to at least one tethered nitrogen heterocycle via a second amide bond. In other embodiments, the tethered nitrogen heterocycle comprises a terpyridine (TerP). For example, a first amino group of PEI forms an amide bond to the acryloyl group of the poly(acryloyl) moiety to provide an amide compound. A second amino group of the PEI moiety of the amide compound forms a second amide bond to the tethered nitrogen heterocycle (e.g., TerP) wherein the nitrogen heterocycle comprises a linker with an acyl group at the distal end of the linker that forms the second amide bond with the second amino group.

In some embodiments, the weight ratio of Psf to PS-PAX is about 4 to 1. In yet other embodiments, said ratio is 5 to 1. In further embodiments, the weight ratio of Psf to PS-PAX is greater than 3 to 1 and less than 6 to 1. In other embodiments, Q is about 0.4 mmol/g to about 5 mmol/g. In other embodiments, Q is about 1 mmol/g, about 2 mmol/g, about 3 mmol/g, or about 4 mmol/g to about 10 mmol/g. In further embodiments, the diameter or average diameter of pore openings at the surface of the membrane or the interconnecting pores is about 100 nm to about 2000 nm (or to about 5000 nm). In yet other embodiments, the pore diameter or average pore diameter (at the surface of the membrane or of the interconnecting pores) is about 100 nm to about 500 nm, about 500 nm to about 1000 nm, about 1000 nm to about 1500 nm, about 1500 nm to about 2000 nm, or about 2000 nm to about 5000 nm. In other embodiments, the chains extend from the inner surface of the pores into the lumen of the pores and pore openings. In yet other embodiments, about 30%-60% or about 50% of the pores at the surface or the membrane or the interconnecting pores have pore diameters in the ranges recited above.

In yet other embodiments, the number averaged molecular weight ($M_n$) of Psf is about 15 kg mol$^{-1}$ to about 35 kg mol$^{-1}$ or about 10 kg mol$^{-1}$ to about 150 kg mol$^{-1}$. In other embodiments, $M_n$ of PS-PAX is about 60 kg mol$^{-1}$ to about 100 kg mol$^{-1}$ or about 20 kg mol$^{-1}$ to about 150 kg mol$^{-1}$. In other embodiments, $M_n$ of Psf is about 22 kg mol$^{-1}$. In other embodiments, $M_n$ of PS-PAX is about 84 kg mol$^{-1}$.

In additional embodiments, the PS-PAX diblock copolymer has a polystyrene weight fraction ($w_{PS}$) of about 0.75 to about 0.95 (or about 0.70 to about 0.95) and a poly(acryloyl) weight fraction ($w_{PAX}$) of about 0.05 to about 0.25 (or about 0.05 to about 0.30). In some embodiments, PS-PAX has a polystyrene weight fraction ($w_{PS}$) of about 0.84 and a poly(acryloyl) weight fraction ($w_{PAX}$) of about 0.16. In other embodiments, PS-PAX is PS-PAA wherein the PAA moiety is poly(acrylic acid).

In various other embodiments, the PS-PAX diblock copolymer comprises Formula I:

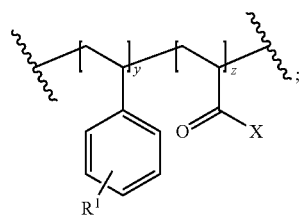

(I)

wherein
each X is independently OH or a branched polyamine;
R$^1$ is H, halo, OH, NH$_2$, alkyl, alkoxy, or alkylamino;
y is 10-1000; and z is 10-1000.
In further embodiments the branched polyamine is a polyamine of Formula

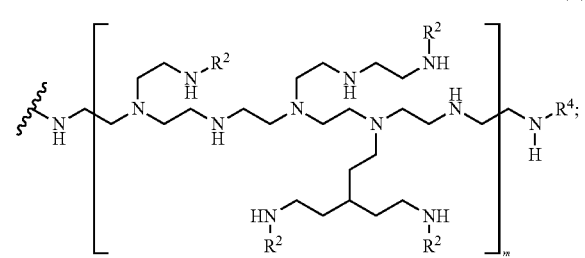

(II)

wherein
each R$^2$ is independently H or —C(═O)R$^3$ wherein R$^3$ is a tethered nitrogen heterocycle;
R$^4$ is H or —C(═O)R$^3$;
each NH is optionally substituted; and
m is 10-1000;

wherein the heterocycle moiety of the tethered nitrogen heterocycle optionally comprises one or more substituents.

The variables y, z, and m can be varied by the selection of the mass of monomers used to prepare the y, z, or m segment of a particular polymer. Accordingly, each of y, z, and m can each independently be about 10-1000, about 50-1000, about 100-1000, about 250-1000, about 500-1000, about 750-1000, about 900-1000, about 10-900, about 10-750, about 10-500, about 10-250, about 10-100, about 50-500, about 100-500, about 250-750, about 200-400, about 400-600, about 600-800, about 200-800, or about 400-800.

In some other embodiments, R$^3$ is a nitrogen heterocycle of Formula III:

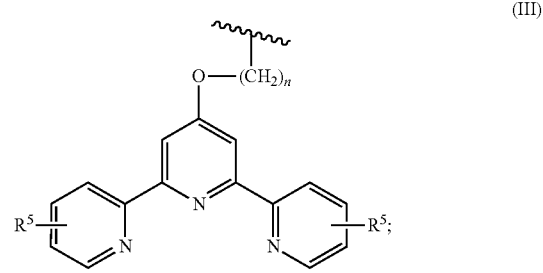

(III)

wherein R$^5$ is H, halo, OH, NH$_2$, alkyl, alkoxy, or alkylamino; and n is 1-10.

This disclosure also provides a method for fabricating a composite membrane comprising:
a) contacting a polysulfone (Psf) and a polystyrene-b-poly(acrylic acid) diblock copolymer (PS-PAA) in an organic solvent to form a casting solution;
b) casting a film of the solution onto a substrate;
c) exposing the film to humidity for a sufficient amount of time to induce phase separation; and
d) annealing the film in water.

In some embodiments, the membrane has a network of interconnecting pores and pore openings at the surface of the membrane, the pores comprise polymer chains extending from the inner surface of the pores into the lumen of the pores and pore openings; wherein the chains comprise a segregated poly(acrylic acid) moiety of the diblock copolymer; thereby fabricating the composite membrane. In various embodiments, the method further comprises e) covalently bonding at least one acryloyl group the poly(acrylic acid) moiety to a branched polyamine via an amide bond, and optionally f) covalently bonding the branched polyamine to at least one tethered nitrogen heterocycle via a second amide bond.

In other embodiments, the diameters of the pore openings are less than about 1000 nm, less than about 2000 nm, or less than about 5000 nm. In various additional embodiments, the casting solution has about 5 wt. % to about 10 wt. % Psf and about 1 wt. % to about 5 wt. % PS-PAA. In other embodiments, the organic solvent comprises a polar solvent, a non-protic solvent, a protic solvent, or a combination thereof. In other embodiments, the casting solution has about 8 wt. % Psf and about 2 wt. % PS-PAA, about 7 wt. % Psf and about 3 wt. % PS-PAA, or about 9 wt. % Psf and about 3 wt. % PS-PAA. In some embodiments, the organic solvent is 2-pyrrolidinone or N-methyl pyrrolidinone.

In some various embodiments, the number averaged molecular weight ($M_n$) of Psf is about 15 kg mol$^{-1}$ to about 35 kg mol$^{-1}$ (or to about 150 kg mol$^{-1}$). In other various embodiments, $M_n$ of PS-PAA is about 60 kg mol$^{-1}$ (or about 20 kg mol$^{-1}$) to about 100 kg mol$^{-1}$. In other additional embodiments, $M_n$ of Psf is about 22 kg mol$^{-1}$. In further embodiments, $M_n$ of PS-PAA is about 84 kg mol$^{-1}$.

In yet other various embodiments, PS-PAA has a polystyrene weight fraction ($w_{PS}$) of about 0.75 (or 0.70) to about 0.95 and a poly(acrylic acid) weight fraction ($w_{PAA}$) of about 0.05 to about 0.25 (or 0.30). In some embodiments, PS-PAA has a polystyrene weight fraction ($w_{PS}$) of about 0.84 and a poly(acrylic acid) weight fraction ($w_{PAA}$) of about 0.16.

In other embodiments, the humidity is about 80% to about 100%, or about 85% to about 95%. In yet other embodiments, the annealing temperature of the water is about 65° C. to about 95° C., or about 75° C. to about 85° C.

Additionally, this disclosure provides a method to capture metal ions comprising contacting one or more composite membranes disclosed above and an aqueous solution comprising one or more dissolved heavy metal ions (e.g., transition metal ions);
wherein the chains of the composite membrane bind the dissolved heavy metal ions, and the chains have a metal ion maximum binding capacity (Q) of about 0.4 mmol/g to about 5 mmol/g; thereby capturing the one or more dissolved heavy metal ions.

In some embodiments, the one or more dissolved heavy metal ions comprise ions one or more transition metal ions. In various embodiments, the one or more heavy metal ions comprise tin, lead, mercury, zinc, cobalt, nickel, samarium, neodymium, cadmium, copper, iron, chromium, palladium, or a combination thereof.

Results and Discussion

Fabrication of Highly Porous Composite Membranes with Surface Segregated PAA Brushes. The processing of functional polymers into thin films with bicontinuous porous structures is critical to generating adsorptive membranes with high permeability values and large surface area-to-volume ratios. Here, the surface segregation and vapor-induced phase separation (SVIPS) methodology, which is based on the controlled intrusion of humid air into a polymer solution, (FIG. 1), was used to generate the desired microstructure.

A casting solution of 8% (by weight) Psf and 2% (by weight) PS-PAA copolymer dissolved in 2-pyrrolidinone (2P) was used to fabricate composite Psf/PS-PAA membranes. This solution was cast into a 305 μm-thick film on a glass substrate using a doctor's blade and exposed to a humid environment at ~95% R.H. and 25° C. for a predetermined period of time. As the water vapor from the environment dissolves into the thin film, it initiates phase separation (i.e., liquid-liquid de-mixing) and the formation of an interconnected spongy structure (*Ind. Eng. Chem. Res.* 2011, 50, 3798; *J. Membr. Sci.* 2005, 258, 140).

Because the nascent pore connectivity of the spongy structure is critical to producing a membrane with high hydraulic permeability, the coalescence of the transient morphology formed by the phase separation was hindered through solvent selection. Namely, 2P was chosen as the solvent because it forms hydrogen bonds with both the Psf matrix and the incoming water vapor. As a result, the viscoelasticity of the polymer-rich phase is increased, which sufficiently elongates the characteristic coalescence time such that the bicontinuous morphology persists over the course of the vapor intrusion process. At the end of the vapor intrusion step, the film is precipitated in a DI water bath to fix the microstructure of the thin film in place. Using this approach, the morphology of the membrane was regulated through tuning the humid air exposure time.

Figure 2:
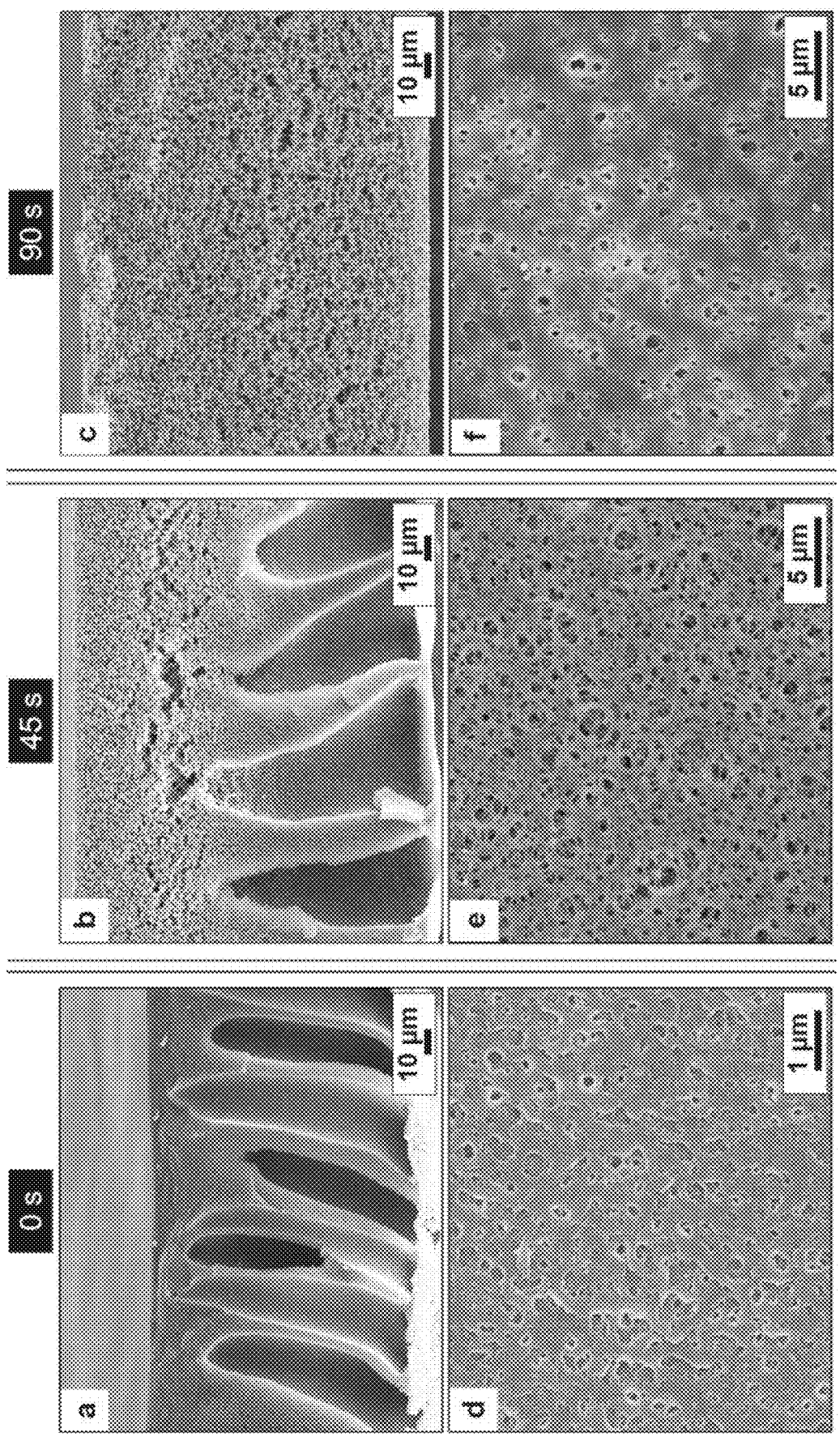
FIG. 2. SEM micrographs show the structure of the composite membranes as a function of the time the cast films are exposed to humid air. At the end of the vapor exposure period, the membranes were plunged into a non-solvent bath to fix the membrane nanostructure in place. (a-c) The cross-sectional architecture of the membranes. (a) Membranes with no exposure to humid vapor precipitated in a manner consistent with the non-solvent induced phase separation (NIPS) process with delayed de-mixing and slow precipitation. In this case, the cross-section possesses an asymmetric morphology with an active layer that tapers into a finger-like macroporous substructure. (b) A short vapor exposure time generates asymmetric membranes that are composed of spongy cells supported by finger-like pores underneath. The transition from a spongy microstructure to a finger-like microstructure occurs in the vicinity of the penetration depth of the water vapor. (c) Membranes with a sponge-like cross-section and graded cellular substructure were obtained with prolonged exposure time to the humid environment. (d-f) The surface morphology of the membranes undergoes a transition from (d) a mesoporous structure that is induced by the NIPS process to (e) a macroporous structure with a higher density of pores produced by short vapor exposure period and (f) macroporous feature with a lower density of pores generated by a longer exposure time.

The formation of a spongy, bicontinuous network of pores is associated with phase separation induced by the penetration of water vapor into the film. This phase separation occurs slowly as the dissolved water vapor traverses the film thickness as a diffusion front. In cases where the film was plunged into the non-solvent bath before the diffusion front of dissolved water was able to reach the lower portion of the thin film near the glass substrate, the polymers precipitated following a non-solvent induced phase separation (NIPS) process. In this case, due to the rapid intrusion of non-solvent, the NIPS process results in asymmetric membranes with a finger-like macroporous substructure (*J. Membr. Sci.* 1992, 73, 259). The contrast in these microstructures can be observed in FIG. 2.

For films not exposed to humid air (i.e., a vapor exposure time of 0 s), a microporous finger-like structure persists over the whole membrane cross-section (FIG. 2a), while for a 45 s vapor exposure time the spongy bicontinuous structure spans part of the membrane thickness before the finger-like structures develop (FIG. 2b). The dissolved water penetrates through the entire film thickness with an exposure of 90 s, and thus a spongy membrane is seen throughout the thickness with cross-sectional pore sizes that slowly taper from ~500 nm surface features to ~1 μm at the bottom. The progression of the spongy microstructure through the cross-section of the films is accompanied by evolving surface structures. The NIPS process generates membranes with surface pore features ~100 nm in diameter. Vapor intrusion initially results in high porosity which decreases with higher exposure times due to the coalescence of the polymer rich phase near the surface. The coalescence also results in a broader range of pore sizes on the membrane surface, with features ranging from 200 to 2000 nm in diameter.

Figure 7:
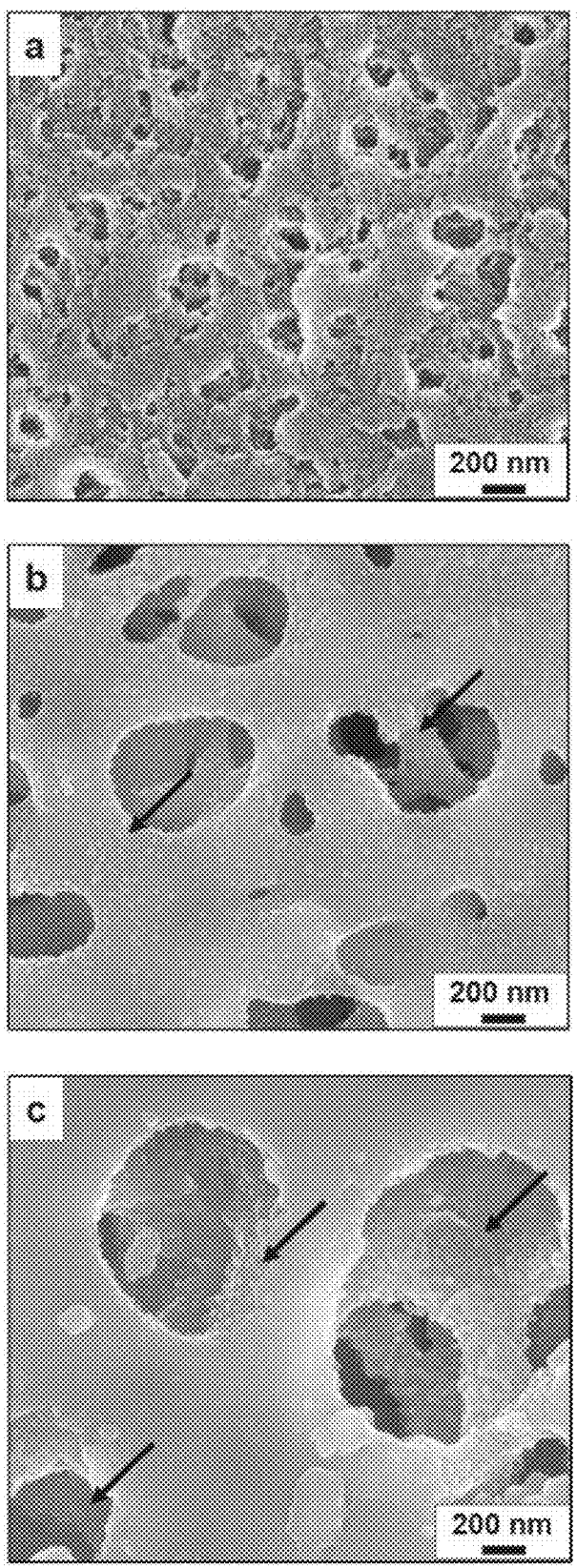
FIG. 7. High-magnification SEM micrographs of the PSf-PAA membrane surface prepared from (a) 0 s, (b) 45 s, and (c) 90 s of vapor exposure. The surface morphology of the membrane produced without vapor exposure, as shown in (a), was guided by the non-solvent induced phase separation. Heterogeneous beads, which are labeled by black arrows in the image (b) and (c), were dispersed across the pore wall surfaces suggesting they are a result of the PAA that segregated to the pore wall of Psf matrix during vapor induced phase separation.
Figure 8:
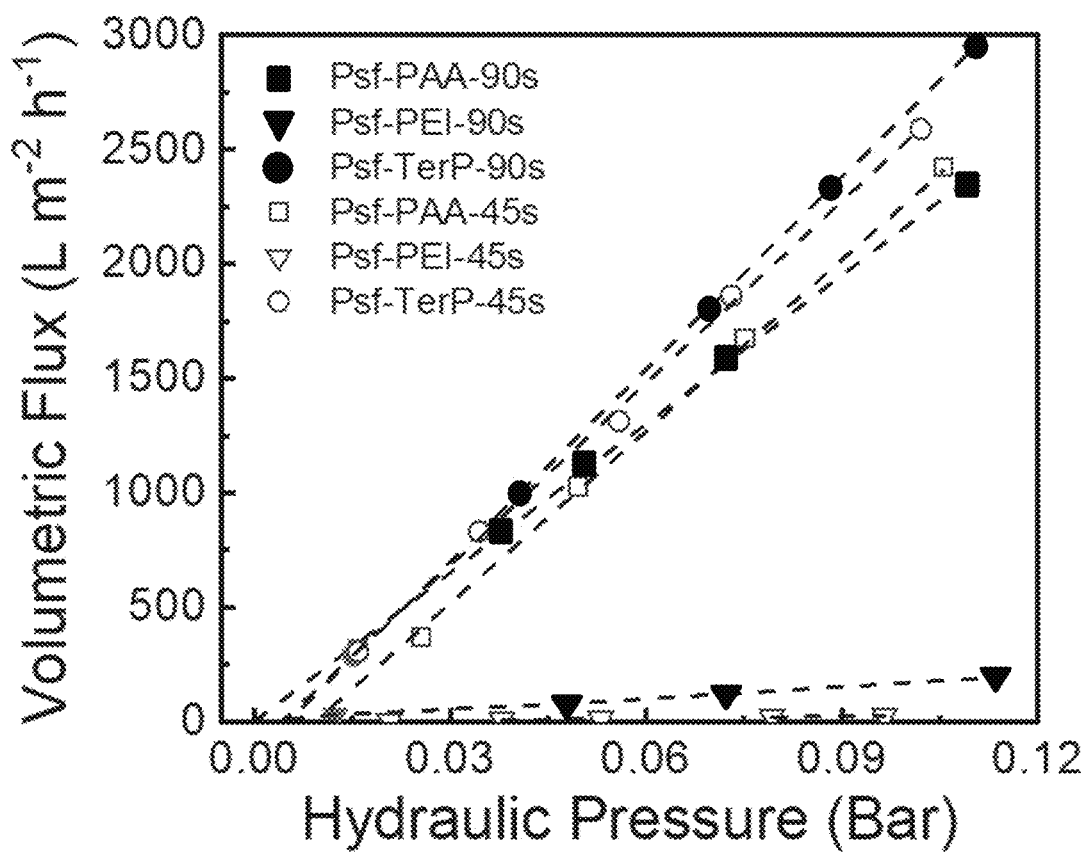
FIG. 8. Volumetric flow rate versus applied pressure for functional Psf membranes that were generated from parent membranes fabricated with different vapor exposure periods. The hydraulic permeabilities were determined from the slope derived from the linear regression (dashed line), measured in DI water with a solution pH of 5.5.
Figure 9:
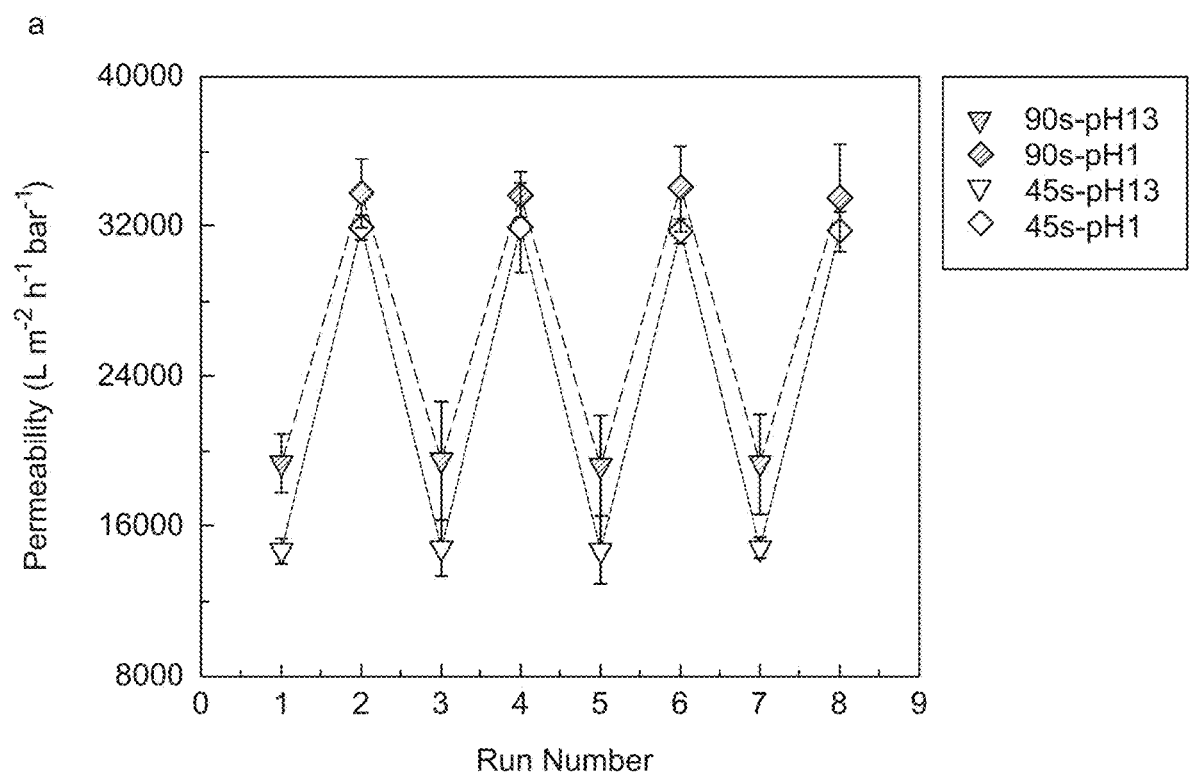
FIG. 9. (a) The hydraulic permeabilities of Psf-PAA-45s and Psf-PAA-90s membranes as a function of solution pH. The permeability of the membrane was measured as it was exposed to solutions that alternated between pH=1 and pH=13. (b) The reversible and repeatable and change in permeability is a direct result of the extension and contraction of the PAA brushes that line the pore walls.
Figure 9:
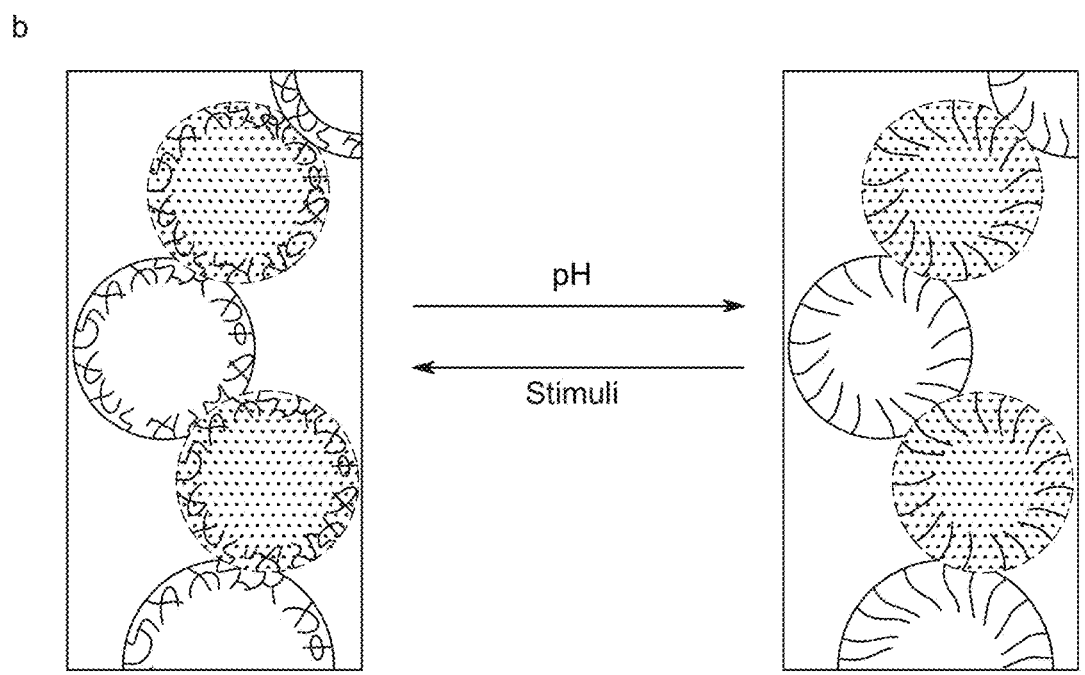
Figure 10A:
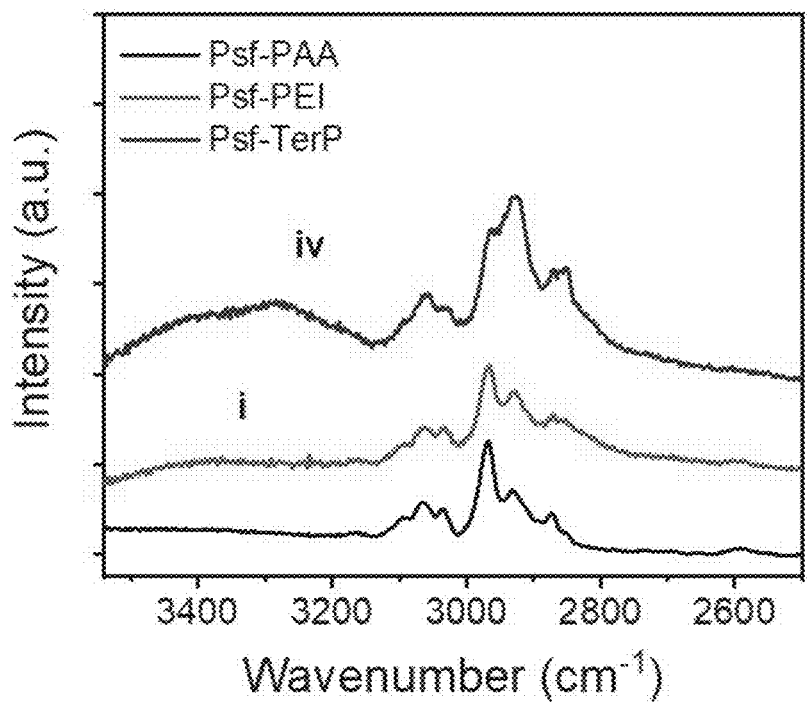
FIG. 10A-D. (a-b) FTIR monitors the successful conversion of the pore wall lining chemistry. The appearance of the peaks at ~3400 $cm^{-1}$ (labeled as i) and ~1640 $cm^{-1}$ (labeled as ii and iii) are consistent with the formation of an amide bond in the PEI functionalized membrane. The broad peak at ~3300 $cm^{-1}$ (labeled as iv), ~1640 $cm^{-1}$ (labeled as v) and ~1560 $cm^{-1}$ (labeled as vi) suggests the formation of additional amide bond. The broad peak at ~1640 $cm^{-1}$ (labeled as v) also suggests the addition of imines from the terpyridine molecule. (c) Full FTIR spectra of functionalized membranes scanned over a range of 650.0≤v≤4,000 $cm^{-1}$. (d) Magnified FTIR spectra over a range of 650.0≤v≤1,350 $cm^{-1}$. The peak intensities of the spectra were normalized using the characteristic sulfone adsorption at 1325 $cm^{-1}$ (*).
Figure 10B:
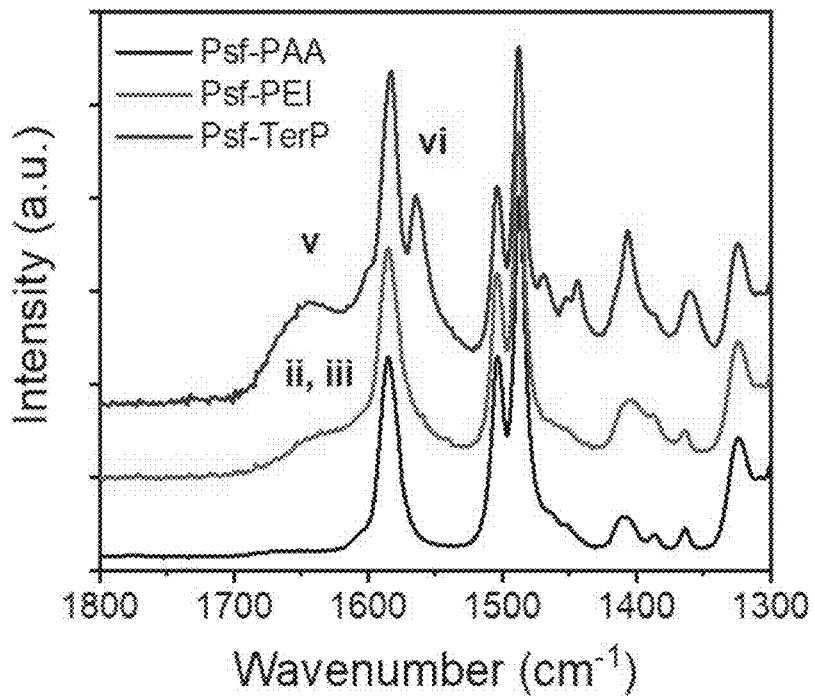
Figure 10C:
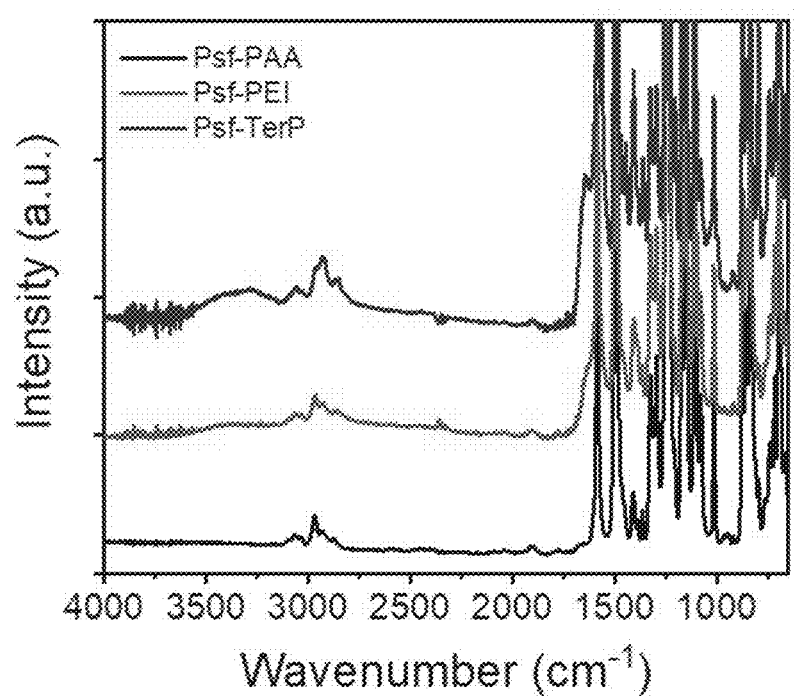
Figure 10D:
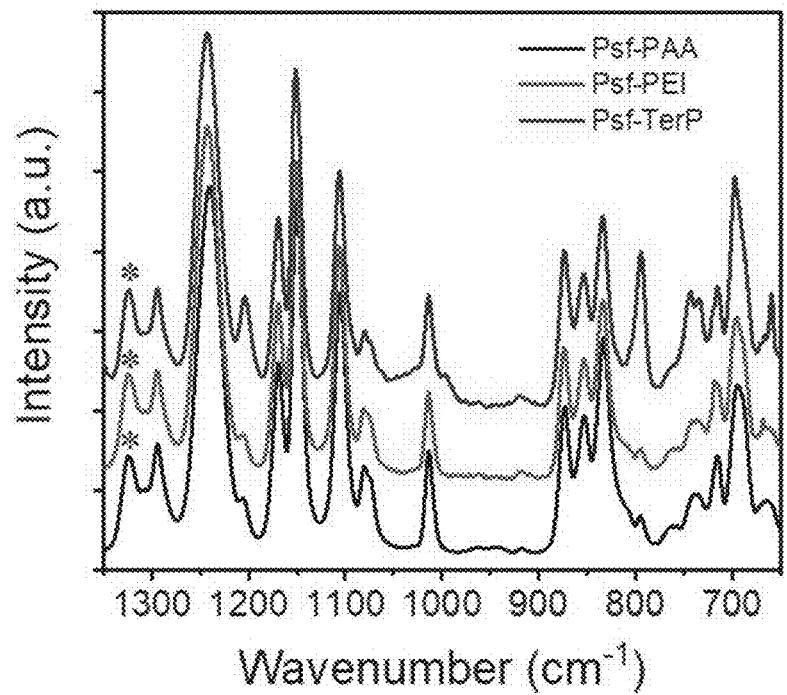

In addition to generating the desired morphology, the SVIPS approach allows for the introduction of targeted chemical functionality along the pore walls of the membrane. The components of the PS-PAA block copolymer were specifically selected to achieve this aim. The aromaticity of the polystyrene repeat units caused the PS block to preferentially mix with the polysulfone matrix during phase separation (*J Membr. Sci.* 2014, 450, 162). Meanwhile, the hydrophilic PAA block preferentially segregated toward the surface of the pore walls as it prefers contact with the non-solvent. Thermal annealing of the films in a water bath at 80° C. enabled the PAA blocks to further segregate into the surrounding water. These surface-segregated PAA brushes were homogeneously distributed over the pore surfaces, as demonstrated by the high magnification micrograph in FIG. 7, thereby allowing full access to the PAA repeat units as functional sites for further coupling reactions. Thus, a bicontinuous, porous membrane template was established which possessed carboxylate groups that could be easily modified to impart functionality directed toward target applications. Here, such functionality is aimed at heavy metal adsorption studies.

pH-responsive Hydraulic Permeability of PAA-lined Template. The pH-responsive hydraulic permeability of the membranes confirmed that the pore walls were PAA-lined and demonstrated the stable attachment of the PAA brushes. At pH 5.5, the composite membrane fabricated with 45 s vapor exposure exhibited a permeability of $2.5 \times 10^4$ L m$^{-2}$ h$^{-1}$ bar$^{-1}$ while the membrane fabricated with 90 s exposure had a permeability value of $2.2 \times 10^4$ L m$^{-2}$ h$^{-1}$ bar$^{-1}$ (FIG. 8). The similarly high permeability values suggest the membranes prepared with a symmetric morphology (90 s) and those fabricated with an asymmetric morphology (45 s) both possess a fully interconnected pore structure. Subsequently, measuring the hydraulic permeability of the membranes while subjecting them to cyclic changes in solution pH (FIG. 9), demonstrated that at pH 13 the hydraulic permeability was $\sim 1.8 \times 10^4$ L m$^{-2}$ h$^{-1}$ bar$^{-1}$ while at pH 1 the hydraulic permeability was $\sim 3.2 \times 10^4$ L m$^{-2}$ h$^{-1}$ bar$^{-1}$. These reversible changes over the course of 6 cycles were consistent with the scaling analysis suggested in the limit of a low Reynolds number flow. Specifically, in this limit, the permeability depends on the effective pore diameter to the fourth power, $d_p^4$; where $d_p$ can be affected by the conformation of the polymer brushes that line the pore walls. Based on the molecular weight of the PAA, the observed changes in permeability were consistent with the extension and contraction of PAA brushes that results, respectively, from the deprotonation and protonation of the carboxylic acid repeat units.

Chemically tailored Surface Chemistries for Targeted Ion Capture. The reaction in Scheme 1 outlines the coupling reactions utilized to tailor the chemistry of the PAA-lined polysulfone template for application as a heavy metal adsorber. Further details of the reaction are shown in Scheme 3. The PAA brushes of the parent membrane exhibit modest metal binding capacities as a result of ion-exchange mechanisms. However, the $pK_a$ of the carboxylic acid (~4.3, based on the value for the PAA monomer) may compromise cation removal performance at moderate pH (i.e., pH 4 to pH 7) due to the reduced number of charged repeat units available to interact with cations. Establishing a covalent linkage between the template wall and a strong transition metal complexing group that can be regenerated is critical to the design of an efficient heavy metal purification device. To achieve this end, the pore wall was further functionalized through two simple chemical reactions. The first reaction attached branched poly(ethylenimine) (PEI), a chemical linker that expands the number of sites available for further modification and heavy metal capture, to the pore wall. PEI was covalently-linked to the PAA block through a carbodiimide coupling reaction that was executed by immersing the membrane in an aqueous solution containing branched PEI ($M_n$~60 kg mol$^{-1}$), 1-ethyl-3-(3-dimethylaminopropyl) carbodiimide hydrochloride (EDC HCl), and hydroxybenzotriazole (HOBt) at room temperature for 4 days. This chemical conversion was monitored using Fourier transform infrared (FT-IR) spectroscopy and the resulting spectra are shown in FIG. 10. The appearance of a broad peak at ~1630 cm$^{-1}$ is associated with the existence of primary amines and the formation of amide carbonyl groups. The PEI possesses its own innate metal-coordinating capabilities through amine electron donation.

Figure 11:
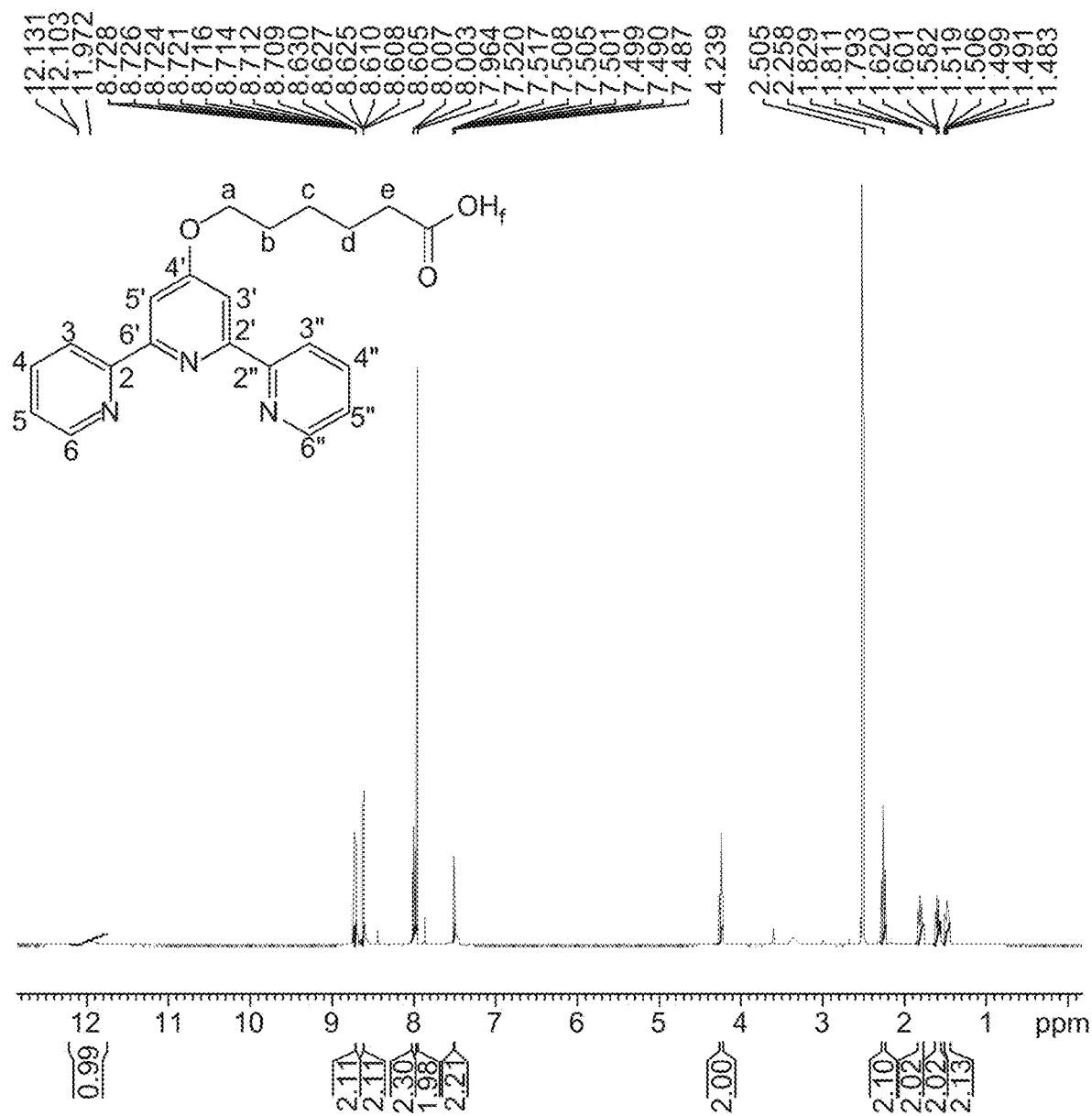
FIG. 11. $^1H$ NMR spectra of the TerP with DMSO-$d_6$ as the solvent. $^1H$ NMR [400 MHz, DMSO-$d_6$]: δ=1.51, (m, 2H, $H_c$), 1.60 (m, 2H, $H_d$), 1.79 (m, 2H, $H_b$), 2.25 (t, J=7.2 Hz, 2H, $H_e$), 4.23 (t, J=6.4 Hz, 2H, $H_a$), 7.5 (ddd, J=7.5, 4.8, 1.2, 2H, $H_{5,5''}$), 7.96 (s, 2H, $H_{3',5'}$), 8.00 (td, J=7.6, 1.8, 2H, $H_{4,4''}$), 8.62 (ddd, J=7.9, 2, 1, 2H, $H_{3,3''}$), 8.71 (ddd, J=4.7, 1.7, 0.9, 2H, $H_{6,6''}$), 12.1 (s, 1H, $H_f$).
Figure 12:
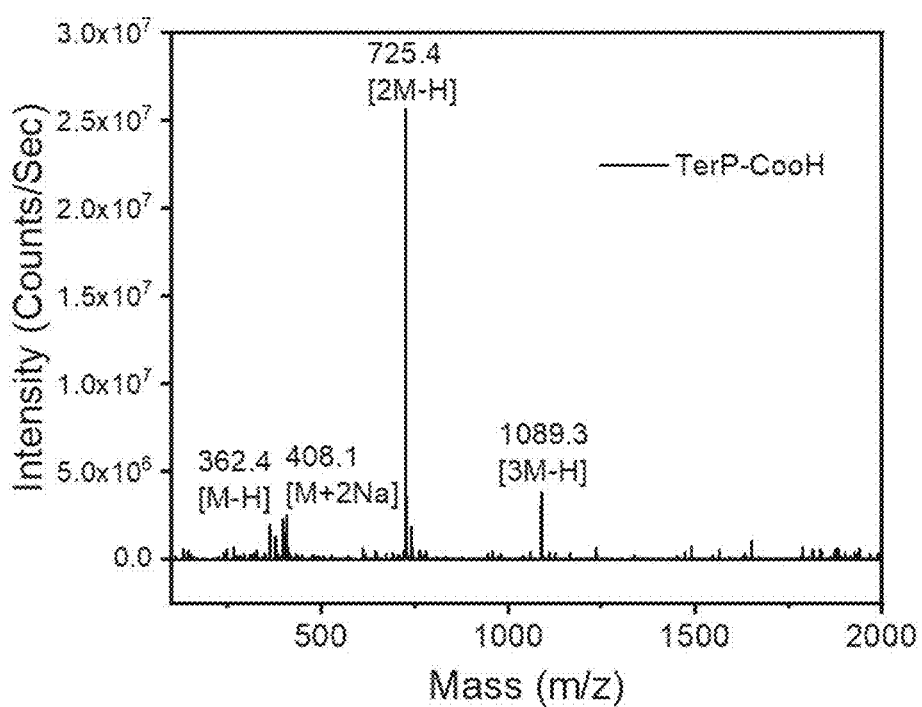
FIG. 12. Mass spectrometric data of the 6-(2,2':6',2''-terpyridin-4'-yloxy) hexanoic acid: MS (ESI Negative) calculated for [M-H]−362.42 g $mol^{-1}$, found: 362.4 g $mol^{-1}$. The peak at 725.4 g $mol^{-1}$ is associated with dimers of the 6-(2,2':6',2''-terpyridin-4'-yloxy) hexanoic acid.
Figure 13:
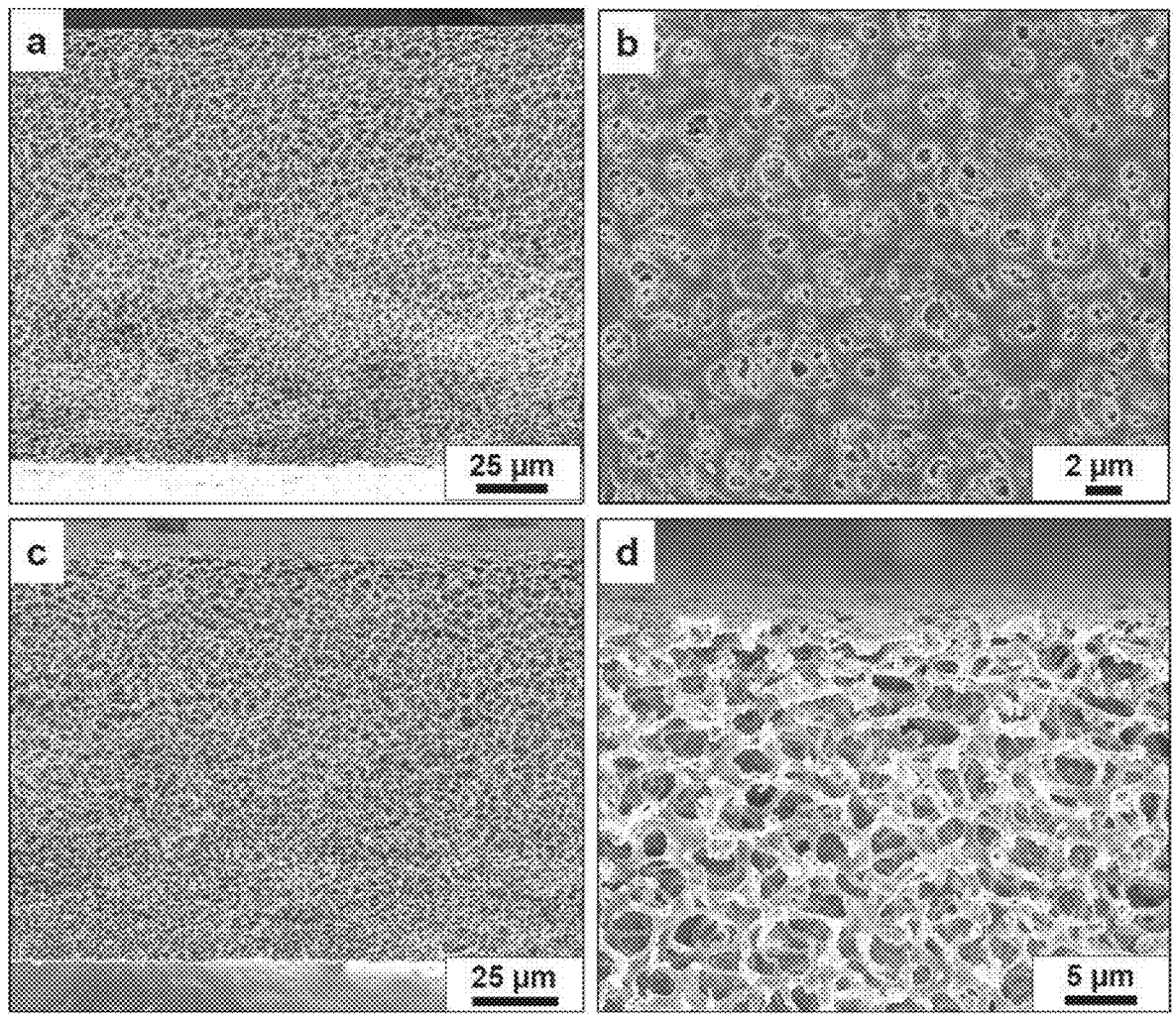
FIG. 13. (a) A cross-sectional SEM micrograph of the Psf-PEI indicates that the interconnected porous structure of the parent Psf-PAA membrane was retained. (b) PSf-TerP membrane surface, which indicates the changes in pore wall chemistry did not significantly alter the membrane morphology. (c-d) Cross-sectional SEM micrographs of the Psf-TerP membrane reveals the similar interconnected porous structure from the Psf-PAA membrane.
Figure 14:
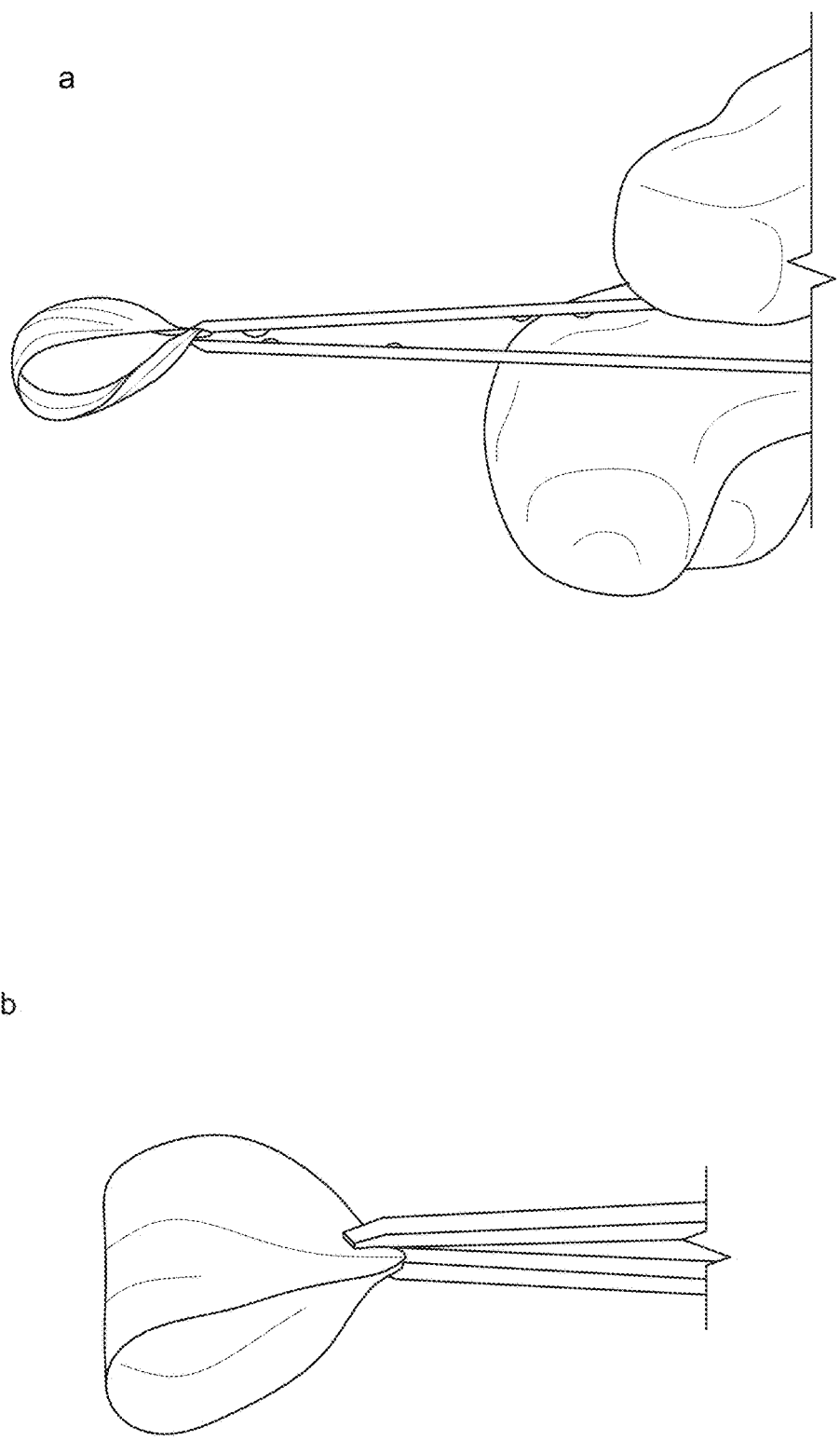
FIG. 14. Representations of the PEI-functionalized polysulfone membrane (Psf-PEI) demonstrating that the membrane is robust and easily handled. (a) Side-on view of the membrane. (b) Angled view of the membrane. The membrane was saturated with cupric chloride.

The second reaction anchors the strong heavy metal coordinating group 6-(2,2':6',2''-terpyridin-4'-yloxy) hexanoic acid (TerP) to the primary amines of the PEI following a similar carbodiimide coupling mechanism as that utilized in the first functionalization step. The synthetic procedure and molecular characterization (i.e., $^1$H-NMR and mass spectroscopy) of the TerP ligand are provided in FIG. 11 and FIG. 12. Using ethanol as a solvent, the heterogeneous membrane-reaction mixture was heated to 70° C. for 12 h because TerP only partially dissolves in polar protic solvents at room temperature. The enhanced peak intensity observed at ~1560 cm$^{-1}$ and ~3300 cm$^{-1}$ of the FT-IR spectrum demonstrates the presence of additional secondary amines adjacent to amide bonds at high-density, which, in turn indicates the successful linkage of the TerP moieties with strong binding affinity for transition metals to the pore walls of the membrane. Furthermore, SEM micrographs in FIG. 13 suggest the morphology of membranes and the pore connectivity that results from the SVIPS process were retained despite modification to the pore wall chemistry. Additionally, it should be noted the chemically modified membranes were mechanically robust and easily handled prior to and after the pore wall coupling reactions (FIG. 14).

Figure 15:
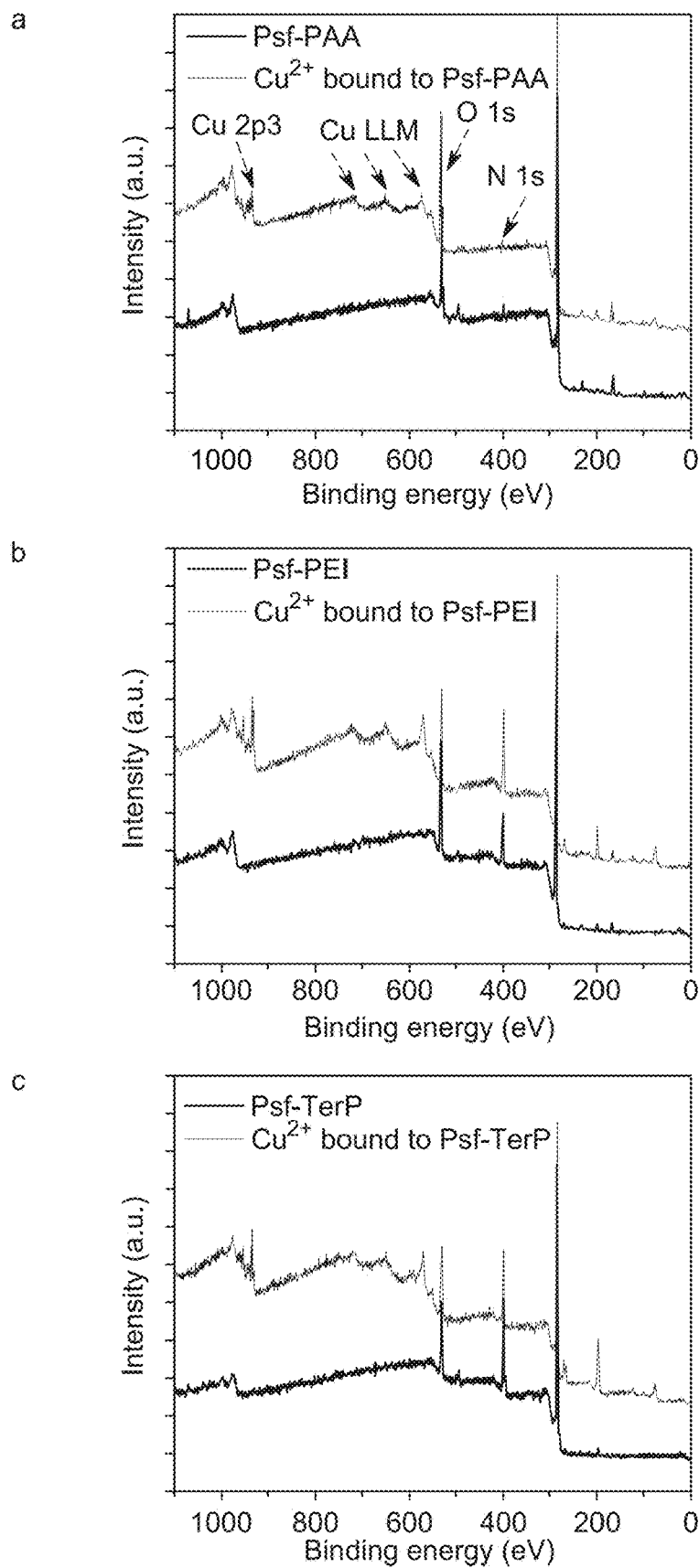
FIG. 15A-C. XPS survey spectra depicting the sequential conversion of (a) Psf-PAA to (b) Psf-PEI and to (c) Psf-TerP. The increasing ratio of the photoelectron intensity of the N is signal to the O is signal is consistent with the increasing nitrogen content that occurs due to the covalent attachment of PEI and TerP to the pore walls of the membranes. The increase of the photoelectron intensity of $Cu^{2+}$ after the three membranes were exposed to a copper-containing solution suggests the successful adsorption of the $Cu^{2+}$ ions to the membrane surfaces. The atomic abundance of $Cu^{2+}$ at the surface of the membrane increased with the addition of the PEI and TerP functionality: 2.1% for the Psf-PAA material, 2.3% for the Psf-PEI membrane, and 2.6% for the Psf-TerP membrane.
Figure 16:
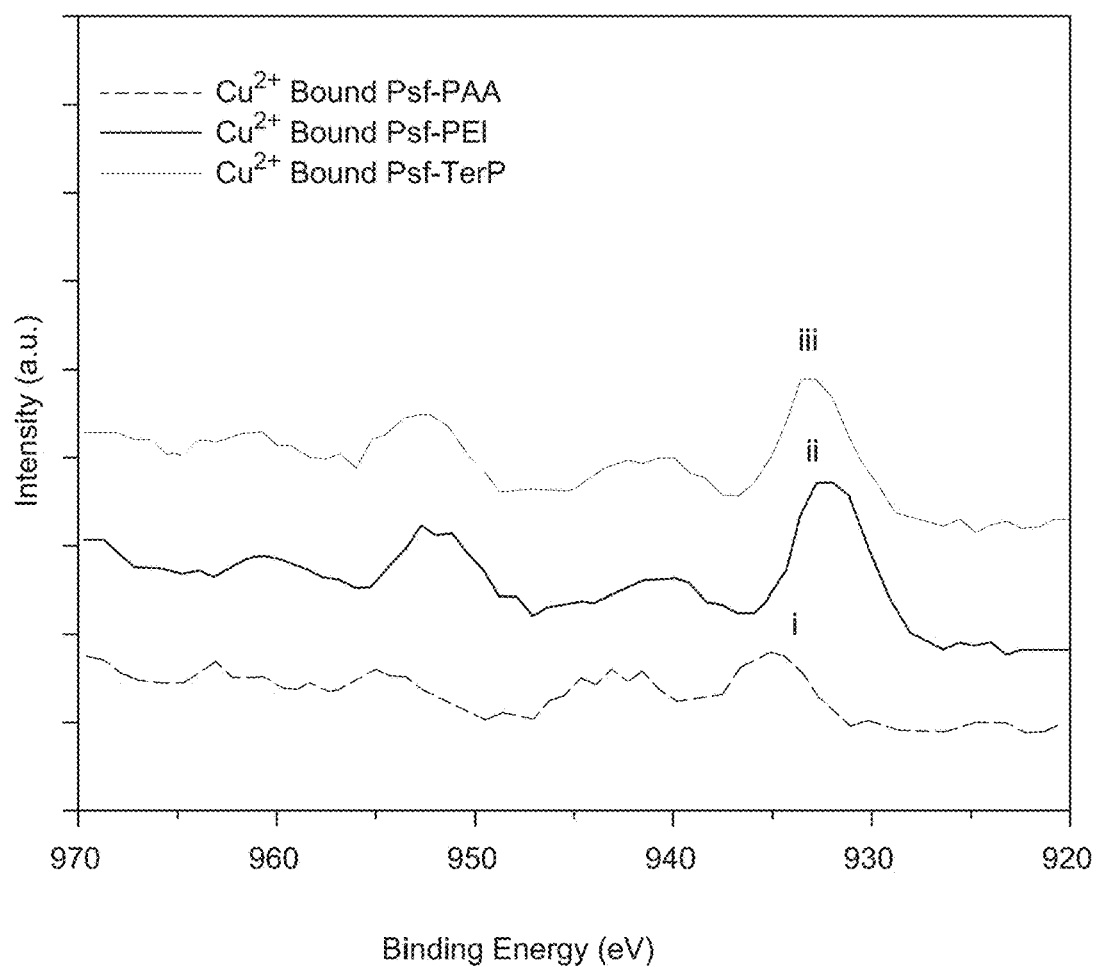
FIG. 16. Magnified XPS spectra. The photoelectron intensity at 934 to 935 eV (i) for the copper ions bound to the Psf-PAA membrane is consistent with the binding energy of Cu2+, 934.7 eV. The copper bound to the amine moieties of the PEI ligand (ii) and the TerP ligand (iii) partially receive donated electrons from the ligands, and hence demonstrate shifted photoelectron peaks in the range of ~932 to 933 eV.

Elemental analysis by X-ray photoelectron spectroscopy (XPS) further corroborates the successful surface modification and provides valuable information to support the heavy metal binding performance of the membranes. While both grafted functional groups, PEI and TerP, contain nitrogen, survey scans of each successively modified membrane (FIG. 15) suggest an increasing trend in nitrogen content as represented by the N 1S photoelectron intensity and decreasing oxygen concentration as characterized by the O 1S intensity. The ratio of nitrogen to oxygen content increased from $8.4 \times 10^{-2}$ for Psf-PAA to 0.76 for Psf-PEI and 0.90 for Psf-TerP. Meanwhile, the cation adsorption performance of each ligand was screened using $Cu^{2+}$ as a model solute. Prior to the XPS study, pieces of membrane saturated with $Cu^{2+}$ were rinsed with excess DI water to remove unbound copper ions. The progression of the PEI-functionalization scheme corresponds with an increasing photoelectron intensity of $Cu^{2+}$, suggesting the incorporation of branched PEI enhanced the number of sites available for cation binding.

Scheme 1. The coupling reactions utilized to convert the pore wall chemistry from a parent PAA-lined pore to a terpyridine-lined pore through an intermediate polyethylenimine-lined (PEI-lined) pore.

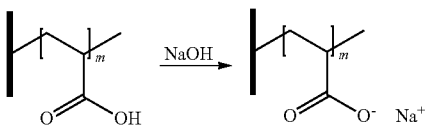

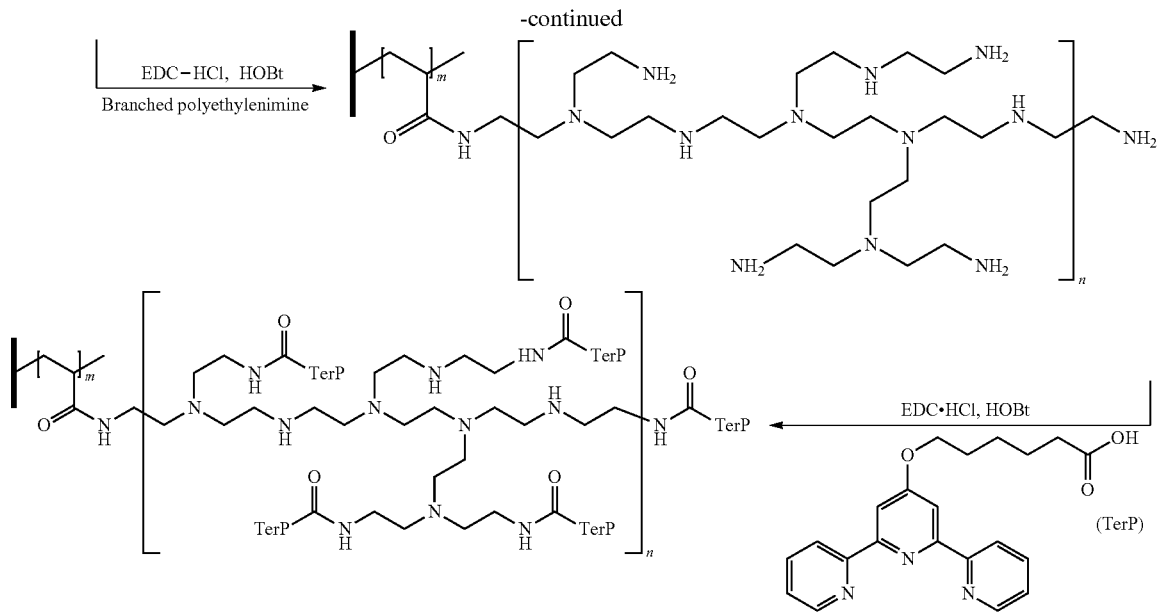

Figure 17:
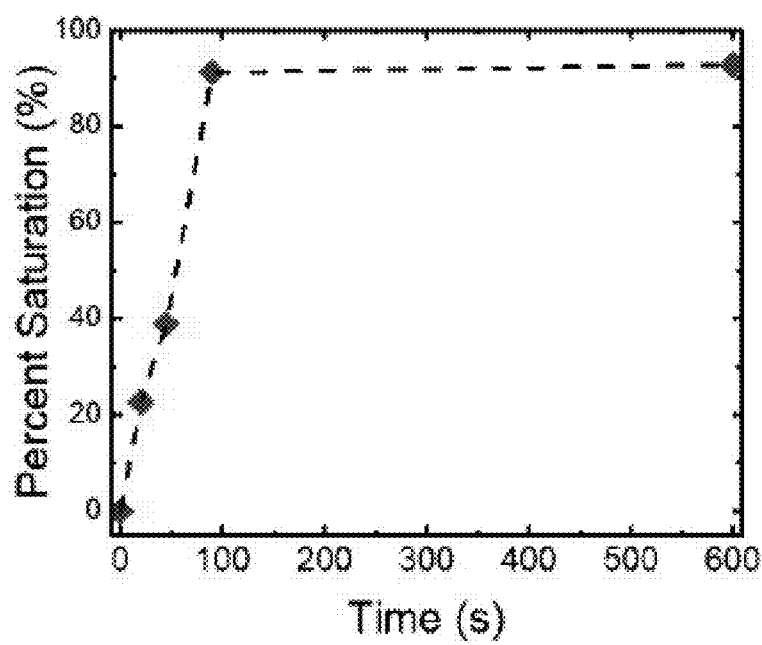
FIG. 17. The adsorption kinetic experiment of the Psf-TerP membrane, in which the samples were fully immersed in a bath of excess cupric chloride solution, suggests that the ~150 μm-thick membrane achieved 90% of its equilibrium capacity within the first 90 s. To guarantee equilibrium uptake, membrane samples were left overnight (i.e., for 8 h) in solution during the binding experiments. The associated video demonstrates the color change that occurs due to $Cu^{2+}$ uptake during exposure to a 10 mM $CuCl_2$ solution for 90 s.

To fully elucidate the Cu$^{2+}$ binding performance of these membranes, the concentration of Cu$^{2+}$ bound to the membrane was systematically determined through static binding experiments. Circular sections of membranes of 2.5 cm in diameter were immersed in aqueous solutions of cupric chloride at varying concentrations and allowed to adsorb cations for 8 h. The membranes reached 90% of their saturation capacity value within 90 sec of exposure to solution but were left overnight to ensure equilibrium was approached (FIG. 17). The bound copper was subsequently released, which regenerated the membranes for repeated use. While the implementation of a pH 1 hydrochloric acid solution was sufficient to protonate the membrane and release the bound Cu$^{2+}$ cations from the Psf-PAA and Psf-PEI membranes, 50 mM ethylenediaminetetraacetic acid (EDTA) solution was needed to remove cations from the Psf-TerP membranes. The Cu$^{2+}$ concentrations in the resulting retentate and release solutions were quantified using ultraviolet-visible (UV-vis) spectroscopy for samples treated with the Psf-PAA and Psf-PEI membranes or inductively coupled plasma optically emitting spectroscopy (ICP-OES) for solutions originating from the use of the Psf-TerP membranes.

Figure 3:
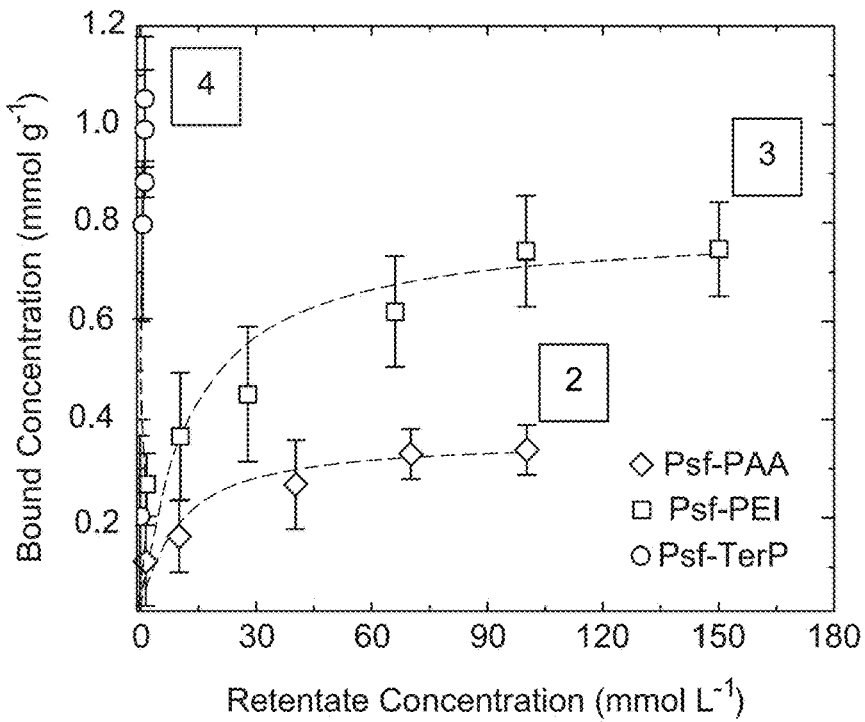
FIG. 3. (a) Copper binding isotherms for the three types of membranes. The concentration of $Cu^{2+}$ bound to the membrane is reported as a function of the concentration of $CuCl_2$ in solution. The dashed lines through the data represent the corresponding Langmuir isotherm determined from linear regressions. The isotherm suggests a saturation capacity of 0.36 mmol $g^{-1}$ for the Psf-PAA membrane and 0.80 mmol $g^{-1}$ for the Psf-PEI membrane. (b) A magnified view of the experimental isotherm for the membranes with terpyridine-lined pore walls. The isotherm suggests a saturation capacity of 1.2 mmol $g^{-1}$. Inset: representations photographs of the parent and copper-saturated membranes situated. (1) bare Psf-PAA, (2) $Cu^{2+}$ saturated Psf-PAA, (3) $Cu^{2+}$ saturated Psf-PEI and (4) $Cu^{2+}$ saturated Psf-TerP. The error bars are propagated standard deviation derived from multiple experiments.
Figure 3:
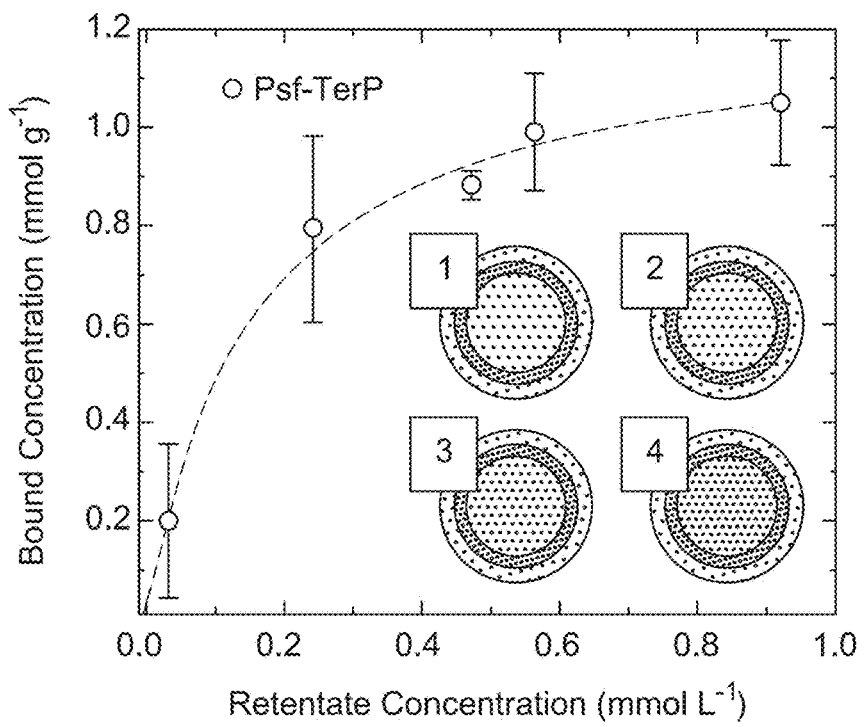

The copper binding isotherms of the membranes determined from these measurements are reported in FIG. 3 with the equilibrium concentrations of bound Cu$^{2+}$ (q) plotted as a function of the retentate concentrations (c). In this manner, the maximum binding capacity (Q) as well as the binding affinity (K) of the three membranes were quantified by fitting the isotherms to the Langmuir model.

$$q = \frac{QKc}{1 + Kc} \quad (1)$$

Figure 18:
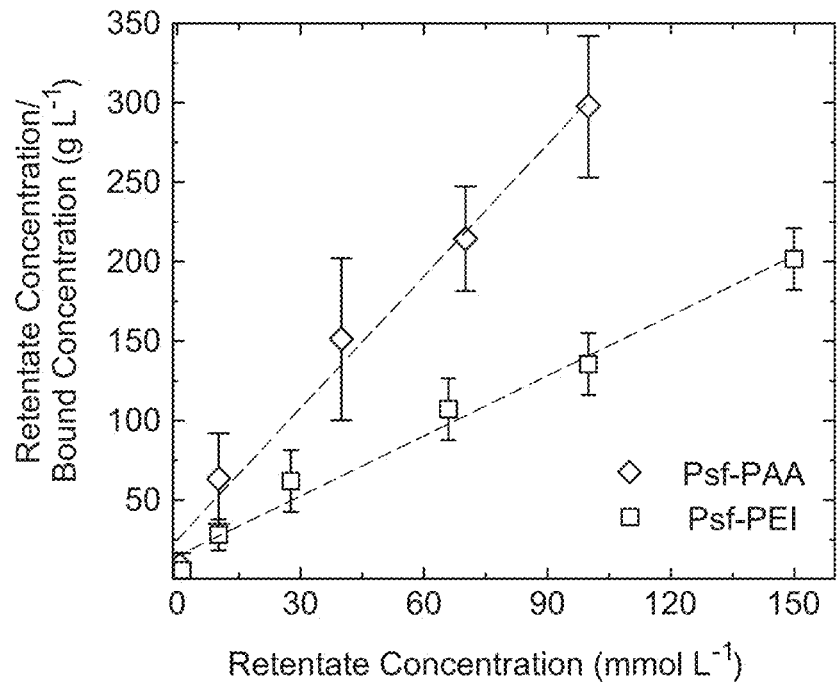
FIG. 18. The linearized Langmuir isotherms of the experimental data. Linear regression of this data (dashed line) was used to extract the binding affinity and saturation capacity of the three membranes for $Cu^{2+}$.
Figure 18:
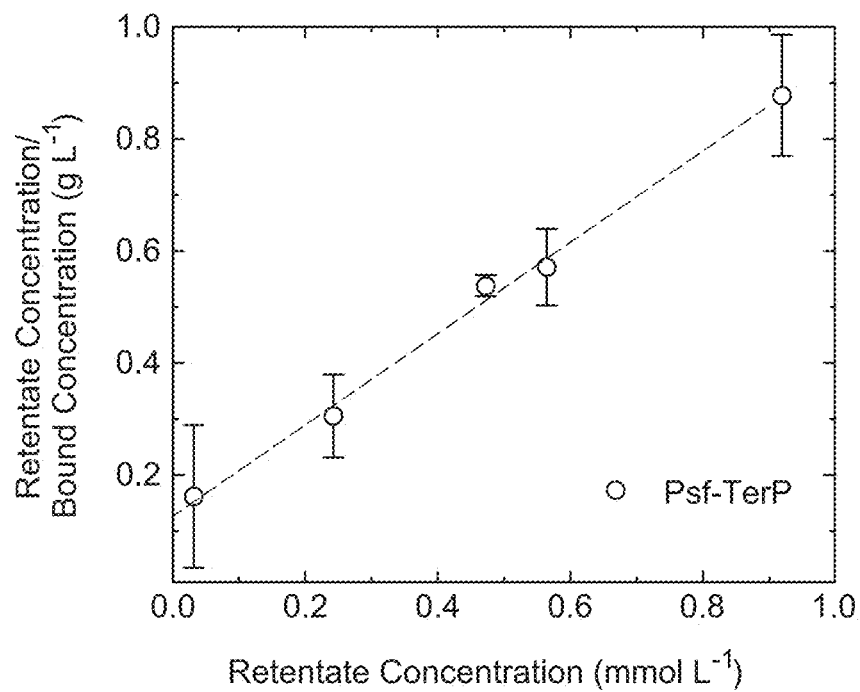

The linearization of the Langmuir isotherm model used to fit the values of Q and K is shown in FIG. 18; the resulting fit is plotted as the dashed lines in FIG. 3. The leftward horizontal shift of the copper binding isotherm for the Psf-TerP membranes (orange circles), which reaches saturation at a retentate concentration of ~1 mM (64 ppm Cu$^{2+}$), demonstrates the strongest copper binding affinity. The thermodynamically favored binding between copper and TerP is characterized by a high equilibrium binding constant of 6400 M$^{-1}$. In contrast, the bound Cu$^{2+}$ concentrations of Psf-PAA (red rhombus) and Psf-PEI (blue square) membranes increase slowly with respect to increasing retentate concentrations with saturation only being approached at higher retentate concentrations near 100 mM (6.4×10$^3$ ppm Cu$^{2+}$). This lower copper binding performance is directly correlated to lower K values of 110 and 82 M$^{-1}$, for PAA-lined and PEI-lined membranes, respectively. These trends in metal binding affinity are consistent with the Pearson acid-base concept that classifies pyridines as a borderline Lewis base that favors binding with Cu$^{2+}$, a borderline Lewis metal ion. Conversely, carboxylate and aliphatic amines are defined as hard binding sites that do not favor binding with Cu$^{2+}$.

While binding affinity directly contributes to the heavy metal capture performance at lower cation concentrations, the maximum binding capacity is another critical parameter in determining the utility of a sorbent for a given process. The Q value determined from the Langmuir isotherm provides a direct comparison between the maximum capacity of the three types of membranes studied here. The original PAA-lined membrane demonstrates a Q value of 0.36 mmol g$^{-1}$, which is slightly lower than the number of acrylic acid repeat units incorporated within the membrane (0.43 mmol g$^{-1}$). That is, the copper binding mechanism at saturation likely follows a one-to-one stoichiometry since ~80% of the PAA repeat units are charged in an aqueous CuCl$_2$ solution with a pH in the range of pH 4 to pH 5 if one-to-one binding stoichiometry is assumed. The covalent attachment of branched PEI to the pore walls introduces additional amine binding sites for cation adsorption, which is consistent with the increased saturation capacity of 0.80 mmol g$^{-1}$. The Q value of the terpyridine-lined membrane was experimentally determined as 1.2 mmol g$^{-1}$. Albeit, it is likely that the number of active binding sites remains nearly constant during the second functionalization reaction, the cation binding mechanism (i.e., with Cu$^{2+}$) may be switched from a four-to-one or six-to-one ligand-to-ion ratio for the branched PEI chemistry to a two-to-one or even one-to-one ratio for the terpyridine chemistry.

Figure 19A:
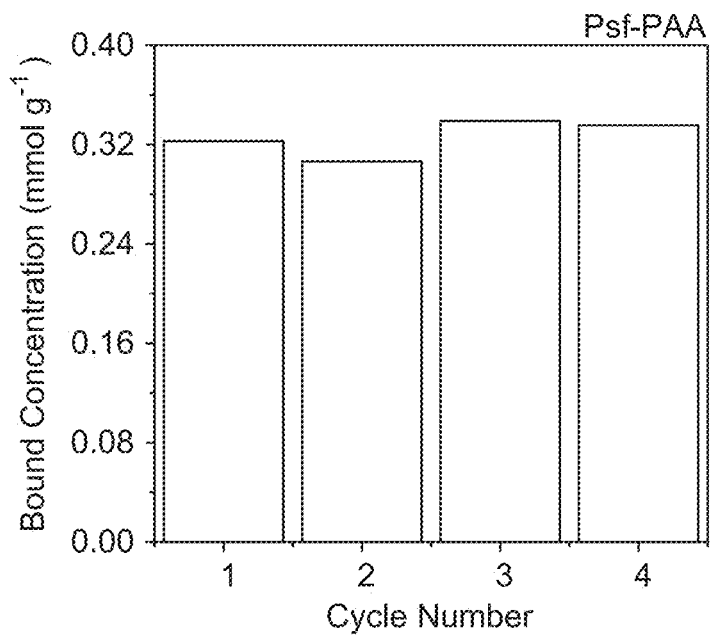
FIG. 19A-C. The equilibrium copper (II) ion uptake for the three types of Psf membranes in repeated adsorption and regeneration cycles. (a) A consistent bound ion concentration of ~0.33 mmol g-1 at a retentate concentration of 70 mM was observed for the Psf-PAA membrane. (b) A bound ion concentration of ~0.74 mmol g-1 was associated with a retentate concentration of 100 mM for the Psf-PEI membrane. (c) A bound ion concentration of ~0.88 mmol g-1 was retained for the Psf-TerP membrane at a retentate concentration of 0.47 mM.
Figure 19B:
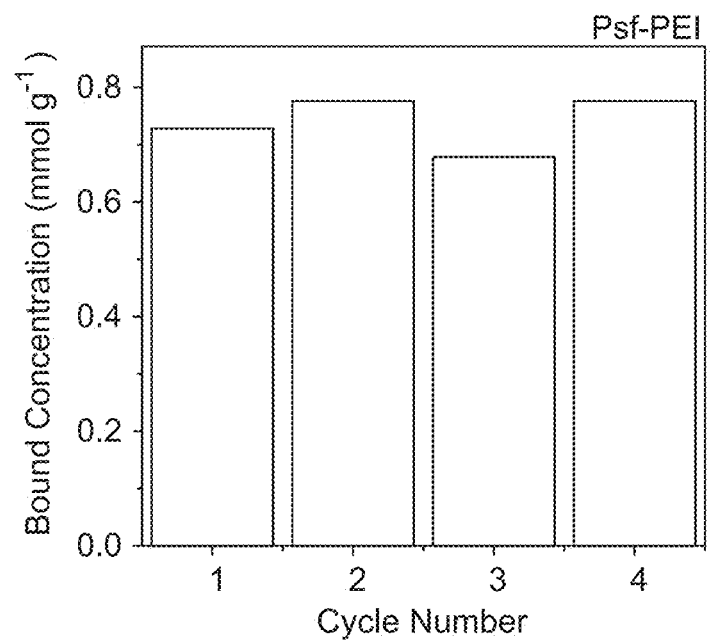
Figure 19C:
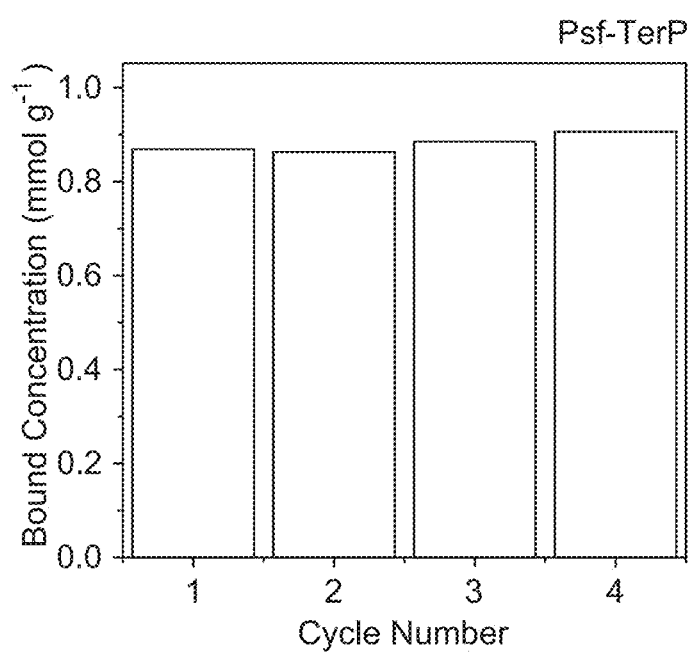
Figure 20:
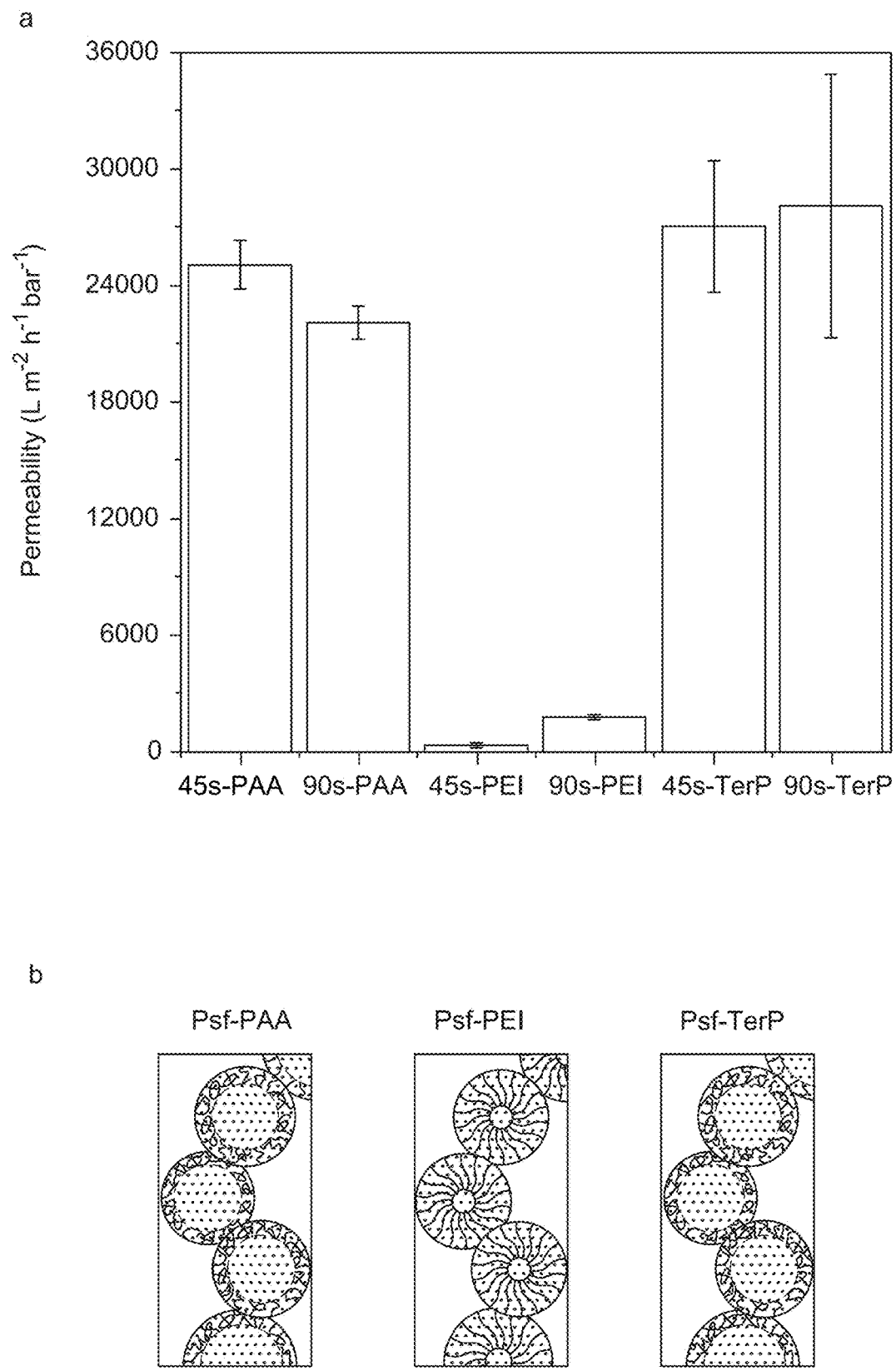
FIG. 20. (a) Hydraulic permeabilities of functionalized membranes derived from the Psf-PAA-45s and Psf-PAA-90s parent membranes. Error bars are propagated standard deviation derived from multiple measurements. (b) Schematic of the hydrated polymer brush conformations, which demonstrates the effective pore size experienced during pressure-mediated flow. The attachment of the hydrophilic PEI brushes significantly reduced the pore size due to the swelling of the brushes towards the center of the pore. In turn, a lower permeability results for the Psf-PEI membrane. Furthermore, the hydrophobic nature of the TerP moieties likely cause the polymer brush to collapse back toward the pore wall, and hence produce a larger effective pore size and permeability.

Photographs of the three membranes at their saturation capacity are displayed in FIG. 3b. The noticeably blue and cyan colors of the PEI-functionalized and TerP-functionalized membranes are consistent with changes expected for $Cu^{2+}$ binding by these different chemistries. The higher affinity and high capacity $Cu^{2+}$ binding exhibited by membranes functionalized with tailored chemical moieties suggests that the binding characteristics of these films can be systematically altered or optimized through the appropriate selection of metal binding groups. No significant change in the sorbent capacity was observed upon recycling these membranes through at least 10 adsorption and regeneration cycles (FIG. 19). Moreover, the value of the hydraulic permeability of the Psf-TerP membranes was similar to that of the Psf-PAA membranes (FIG. 20), further suggesting the pore structure (e.g., membrane morphology) was not significantly changed during the pore wall modifications.

Figure 4A:
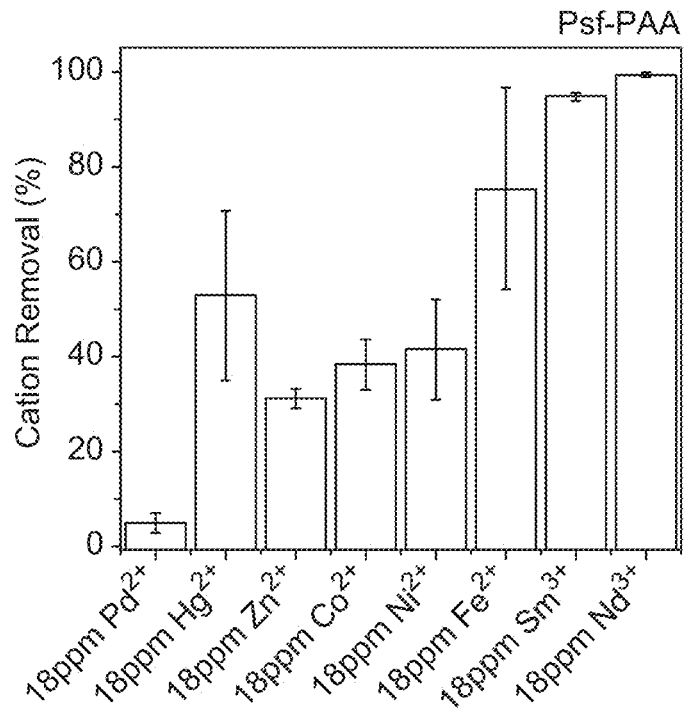
FIG. 4A-F. (a-c) A survey of metal ion removal efficiency for the Psf-PAA membranes, the Psf-PEI membranes, and the Psf-TerP membranes in deionized water. The static adsorption experiments were performed with an initial cation concentration of 18 ppm and with a packing ratio of 2.0 g of membrane per L of solution. (d-f) A comparison of $Pb^{2+}$ and $Cd^{2+}$ removal by the Psf-PAA membranes, the Psf-PEI membranes, and the Psf-TerP membranes. The metal ion removal experiments were executed in deionized (DI), synthetic ground water (Ground), and artificial sea water (Sea). A single metal salt at an initial cation concentration of 6 or 18 ppm was utilized in each experiment. The membranes were added to these solutions at a packing ratio of 2.0 g of membrane per L of solution. The initial and final cation concentrations were assessed using ICP-OES. Error bars are propagated standard deviation derived from multiple measurements.
Figure 4B:
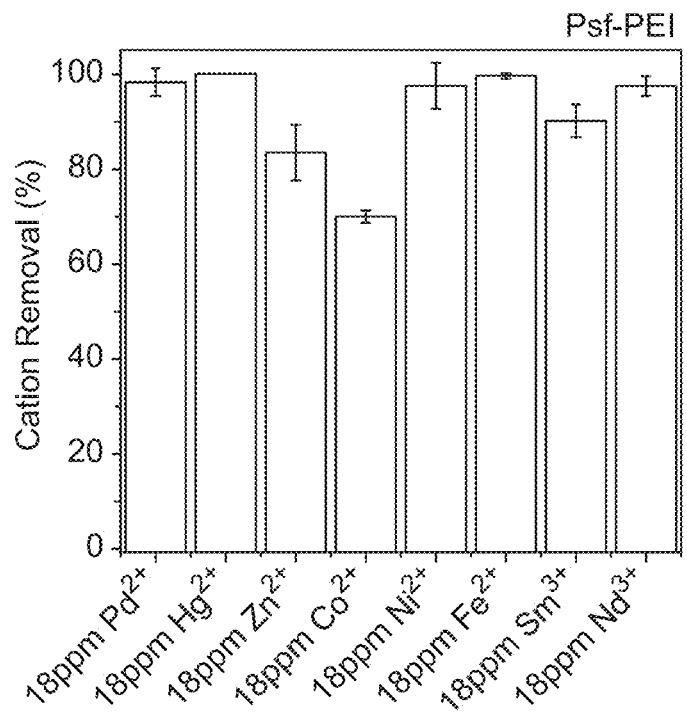
Figure 4C:
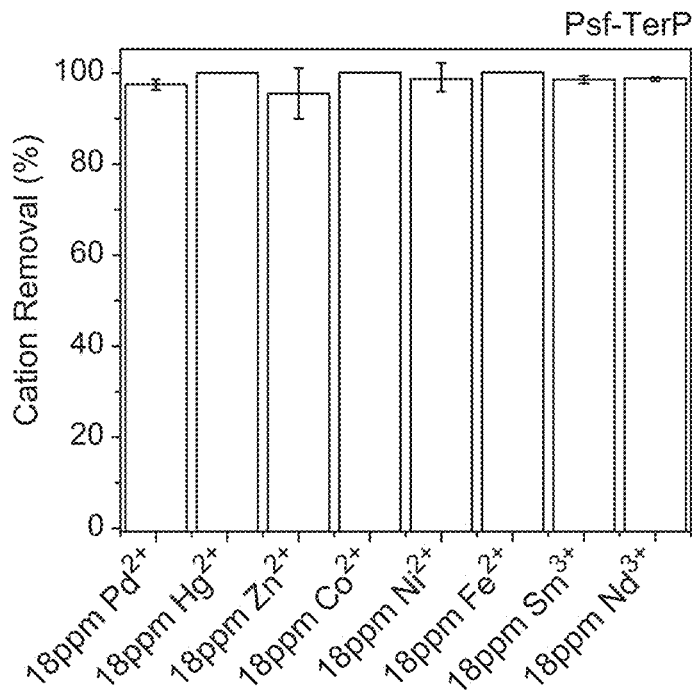
Figure 4D:
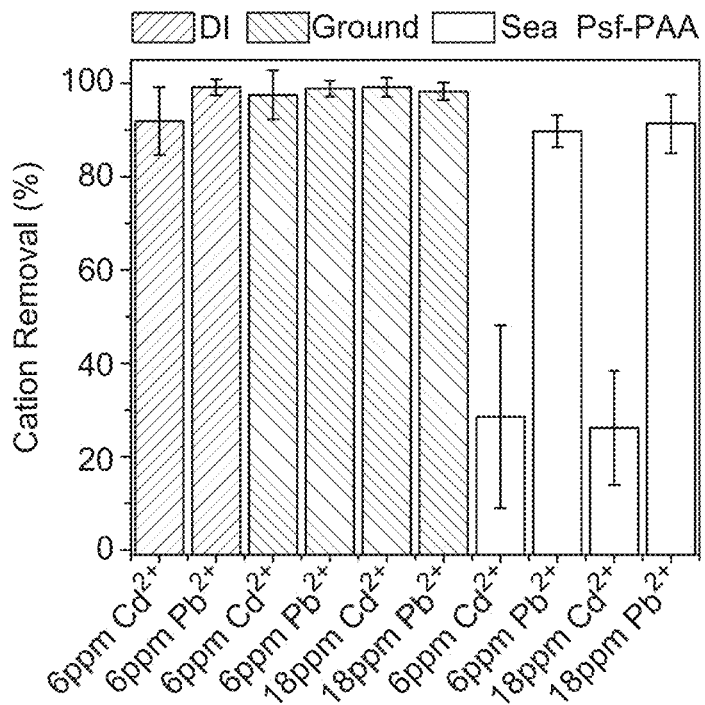
Figure 21:
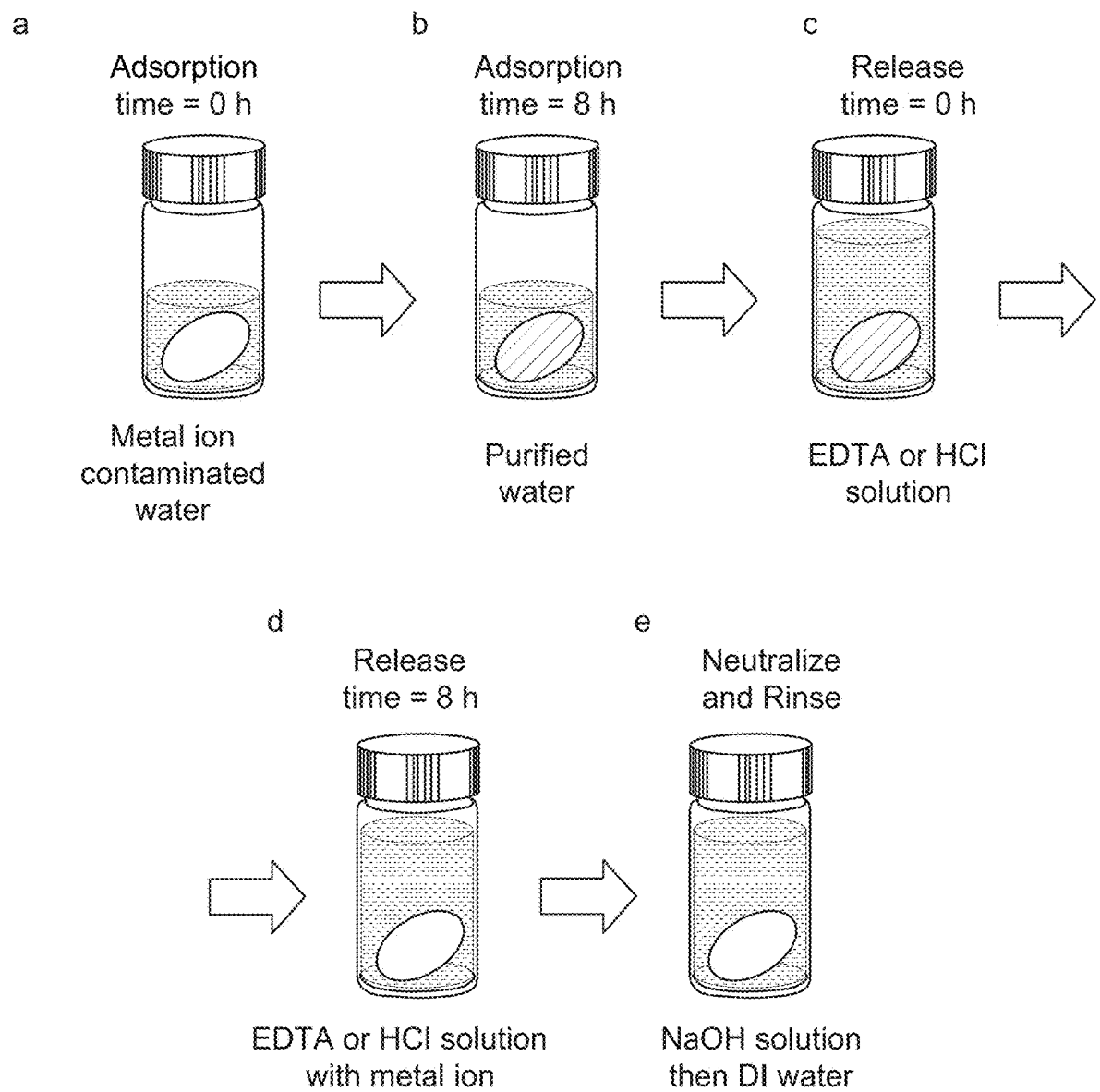
FIG. 21. Schematic of the batch heavy metal uptake experiment. (a) A circular section of a membrane that was 2.5 cm in diameter was submerged in a metal-ion containing solution. (b) The membrane was submerged for 8 h. During this period, metal ions were sequestered on the sorbent surface until an apparent equilibrium was reached. (c) The metal ion-saturated membrane was then transferred to a release solution. An aqueous hydrochloric acid solution (pH 1) was used for the Psf-PAA and the Psf-PEI membranes and an aqueous 50 mM EDTA solution was used for the Psf-TerP membranes. (d) The membrane was soaked in the release solution for 8 h to ensure metal ion desorption. (e) The membranes were rinsed with excess sodium hydroxide solution (pH 13) then DI water before being recycled for subsequent adsorption experiments.
Figure 22A:
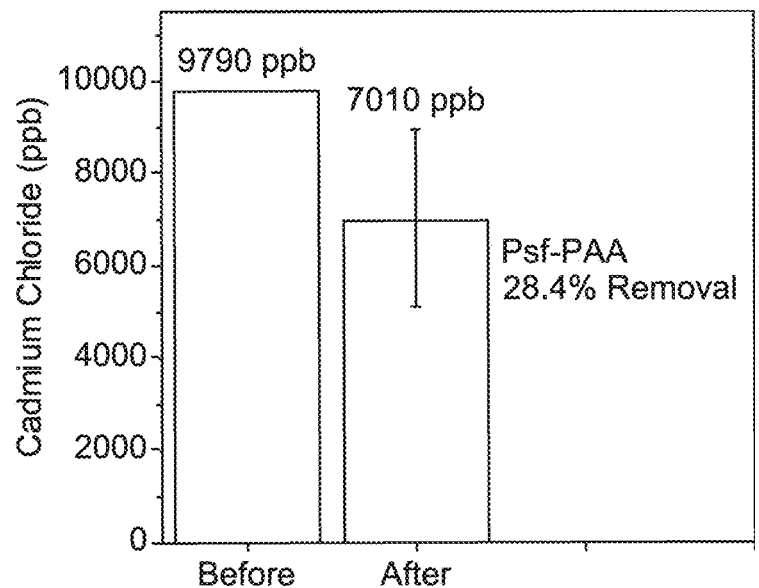
FIG. 22A-C. A set of representative data that was used to calculate the cation removal performance of the various membranes. The heavy metal ion concentrations were the measured raw data. For this experiment, an initial cadmium chloride ($CdCl_2$) concentration of 9.8 ppm (6.0 ppm $Cd^{2+}$ ion) in artificial sea water was utilized. After the membranes were allowed to soak in solution for 8 h, the final concentrations of cadmium in solution were measured. The data were then processed and reported as percentage cation removal. The Psf-TerP demonstrated the highest percent removal by producing a treated solution with a $CdCl_2$ concentration <13 ppb (<8.0 ppb $Cd^{2+}$ ion).
Figure 22B:
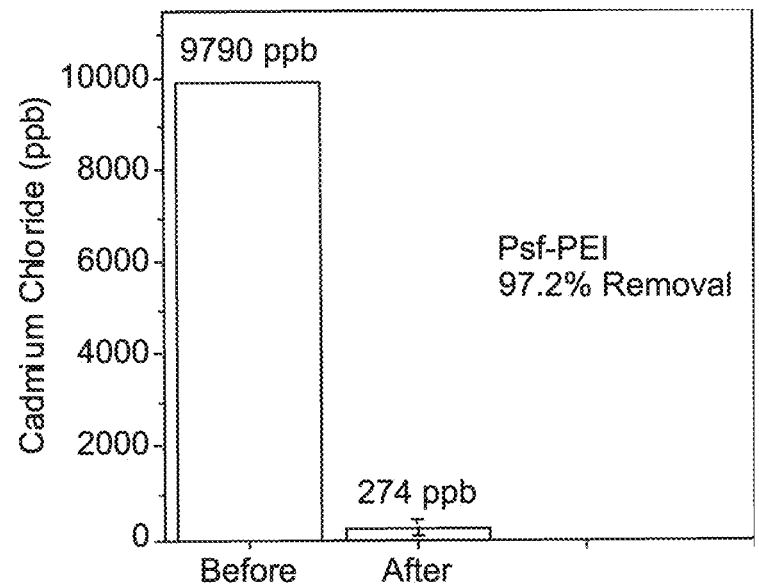
Figure 22C:
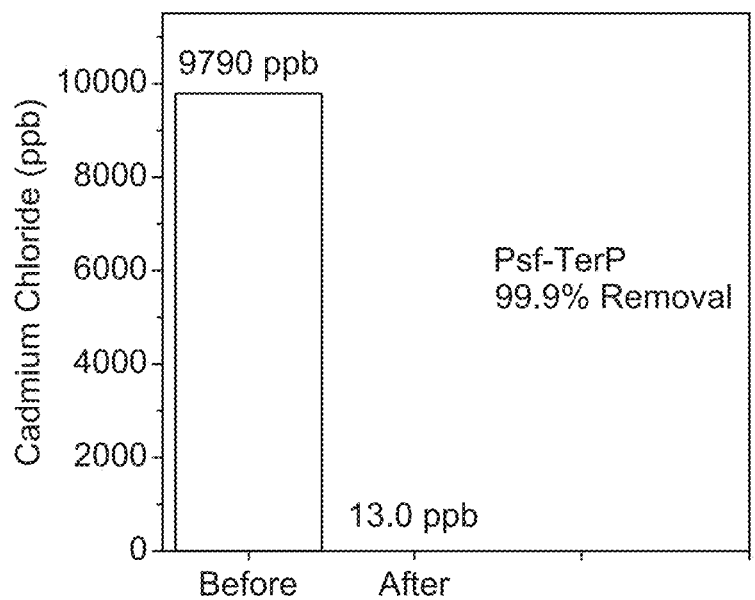
Figure 23:
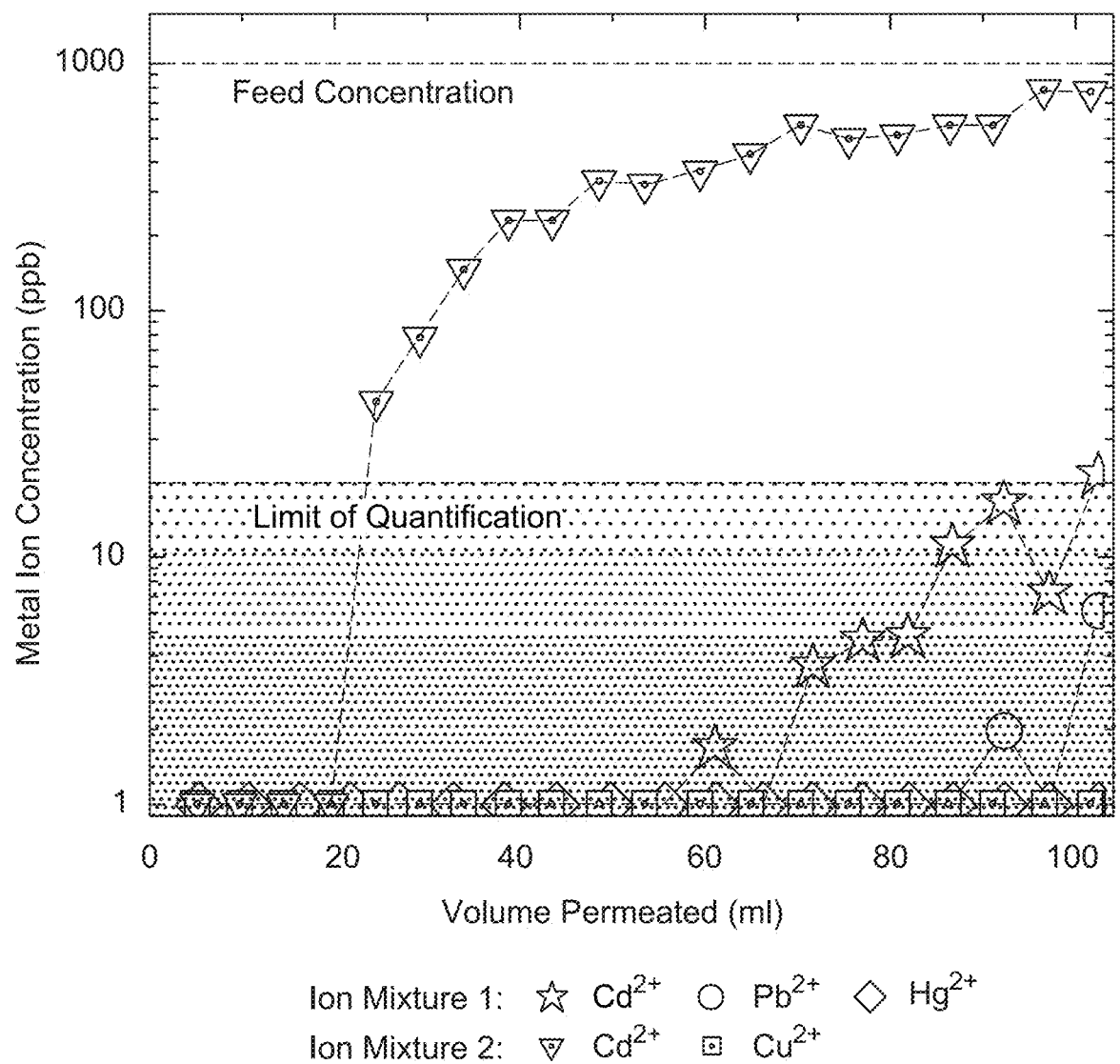
FIG. 23. The ion concentration retrieved from ICP-OES analysis in the breakthrough experiment. In many instances, the concentration of heavy metal contaminants in the effluent from the membrane test bed were indistinguishable from DI water (i.e., below 1 ppb), which is below the limit of quantification (LOQ) of the ICP-OES. In the corresponding figure in the main text, the ion concentration in the permeate solution were plotted at the LOQ for the various metal ions, and this region is also shaded. $Cd^{2+}$ and $Pb^{2+}$ readings below their LOQ values were adjusted up to 10 ppb, while the $Cu^{2+}$ and $Hg^{2+}$ readings were adjusted up to 5 and 20 ppb, respectively.

Transition Metal Ion Capture Performance. Engineering the pore wall chemistry manipulates the transition metal binding profile of the three membranes over a broad spectrum of cationic species, as highlighted by the results presented in FIG. 4. The cation removal performance of membranes was assessed by immersion in single component solutions containing one of 8 transition metal cations at a concentration of 18 ppm. Further details of the batch uptake experiments are provided in FIG. 21. A packing ratio of 2.0 g membrane (L of solution)$^{-1}$ was used. The pH of these solutions was unadjusted except for experiments with $PdCl_2$, which were executed at pH 1. After leaving the solutions unstirred for 8 h, the membranes were removed and the concentrations of metals in the retentate solutions were determined using ICP-OES. The extent of cation removal was determined by measuring the concentration of targeted ion in solution before and after the adsorption experiment (e.g., as shown in FIG. 22). The Psf-TerP membranes removed the 8 cations indiscriminately (FIG. 4c), as demonstrated by metal ion removals in excess of 95% for all metal species. This performance is likely attributed to the high affinity of the cations to the terpyridine rings. Critically, this performance, which was achieved with highly-permeable thin films that exhibit minimal mass transfer resistance, is similar with metal-organic framework based (MOF-based) ion traps.

The other membranes in this study, Psf-PAA and Psf-PEI, display less efficient ion removal due to lower binding affinities and saturation capacities. In the case of PAA-lined membranes, the moderate $pK_a$ of acrylic acid makes the concentration of deprotonated carboxylate groups susceptible to protonation, which reduces the number of available binding sites. In an extreme example, due to the hydrochloric acid incorporated to facilitate the dissolution of $PdCl_2$, the binding solution was pH 1. At this low pH, most of the PAA repeat units are protonated, and thus <5% of the $Pd^{2+}$ was removed from solution. Furthermore, PAA offers hard binding sites with higher equilibrium constants when complexing with hard Lewis metal ions [such as $Nd^{3+}$ or $Sm^{3+}$, which were >90% removed (FIG. 4a)]. However, the binding between soft and intermediate Lewis acids to PAA is less favored, resulting in lower equilibrium binding constants, as exampled in $Cu^{2+}$ binding, and only partial removal of many of the cations selected in the screening experiment.

In contrast, the Psf-PEI material displayed more efficient cation removal as a result of its increased saturation capacity. Through the covalent attachment of densely packed amine moieties onto the parent Psf-PAA membrane, the PEI-lined membrane efficiently purified a broad range of heavy metal ions (FIG. 4b), while partially (~70%) removing $Co^{2+}$ and $Zn^{2+}$. Given its ability to surpass the removal efficiency of carboxylate and amine-based membrane adsorbers, the indiscriminate complexion of TerP lined membrane adsorbers to heavy metal ions demonstrates its potential in applications related with wastewater treatment and trace metal recovery.

The ability to reversibly adsorb heavy metal ions of concern to human health and the environment, especially with high concentrations of competing or interfering dissolved ions in the background, is critical to the development of membrane sorbents for use in saline sources of water. To this end, experiments were conducted to screen lead ($Pb^{2+}$) and cadmium ($Cd^{2+}$) removal by membranes immersed in solutions with cation concentrations of 6 and 18 ppm. Both of these concentrations are higher than the cation concentration typical of contaminated water, which is on the order of ~10-100 ppb.

Figure 4E:
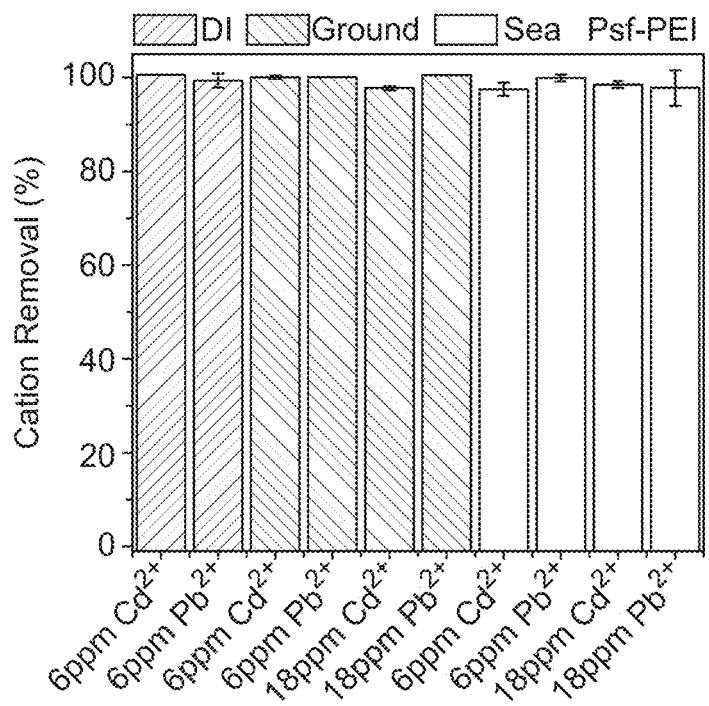
Figure 4F:
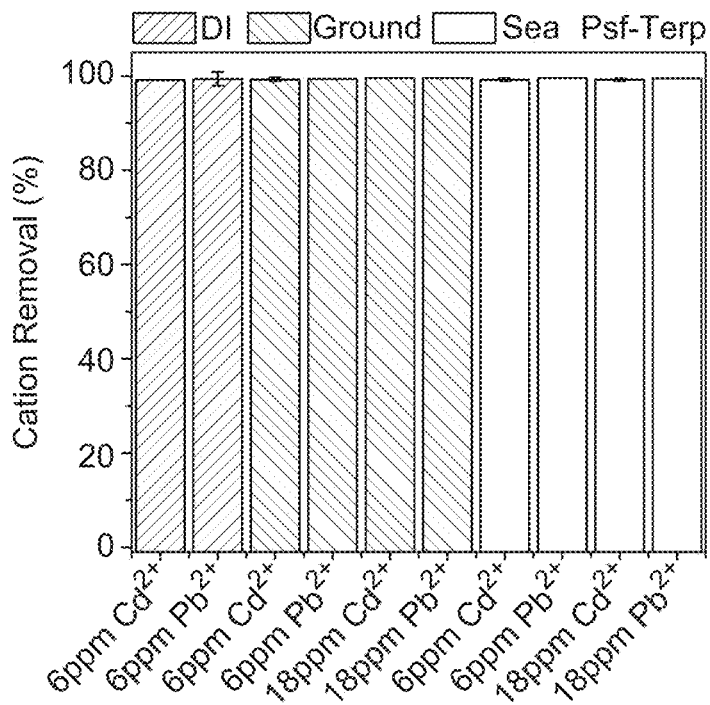

A packing density of 2.0 g membrane $L^{-1}$ was used in these experiments. As shown in FIG. 4e and FIG. 4f, both Psf-PEI and Psf-TerP remove 99+% of metal cations, even in the presence of monovalent and multivalent ions present in synthetic groundwater and seawater, which have total dissolved solids (TDS) values of 820 ppm and 36,000 ppm, respectively. The ability of Psf-PEI and Psf-TerP to remove lead and cadmium even in solutions containing high concentrations of competing ions and/or background electrolytes suggests utility in a wide variety of environments. In addition, the high permeability of the Psf-TerP membrane adsorbers (FIG. 20) on the order of ~2.8×10$^4$ L m$^{-2}$ h$^{-1}$ bar$^{-1}$ could make them candidates for multistage operations, such as in conjunction with RO/NF separations where adsorbers could be used to remove metal ions from the concentrated brine prior to its disposal.

Because deprotonated PAA operates by a different binding mechanism that more closely resembles ion-exchange, the performance of the Psf-PAA membrane in the presence of background electrolytes is different, and in this case worse, then that of Psf-PEI or Psf-TerP. As a control, Psf-PAA shows a lower removal performance when there is no background electrolyte and can only partially remove heavy metal ions contained in synthetic seawater. At high ionic strength (e.g., seawater), the number of available charges may be screened or neutralized by Manning condensation initiated by counterions from the background solution. In contrast, at low ionic strength (i.e., DI water), the charge density of deprotonated PAA may be affected by charge regulation that decreases the number of available binding sites.

Figure 5:
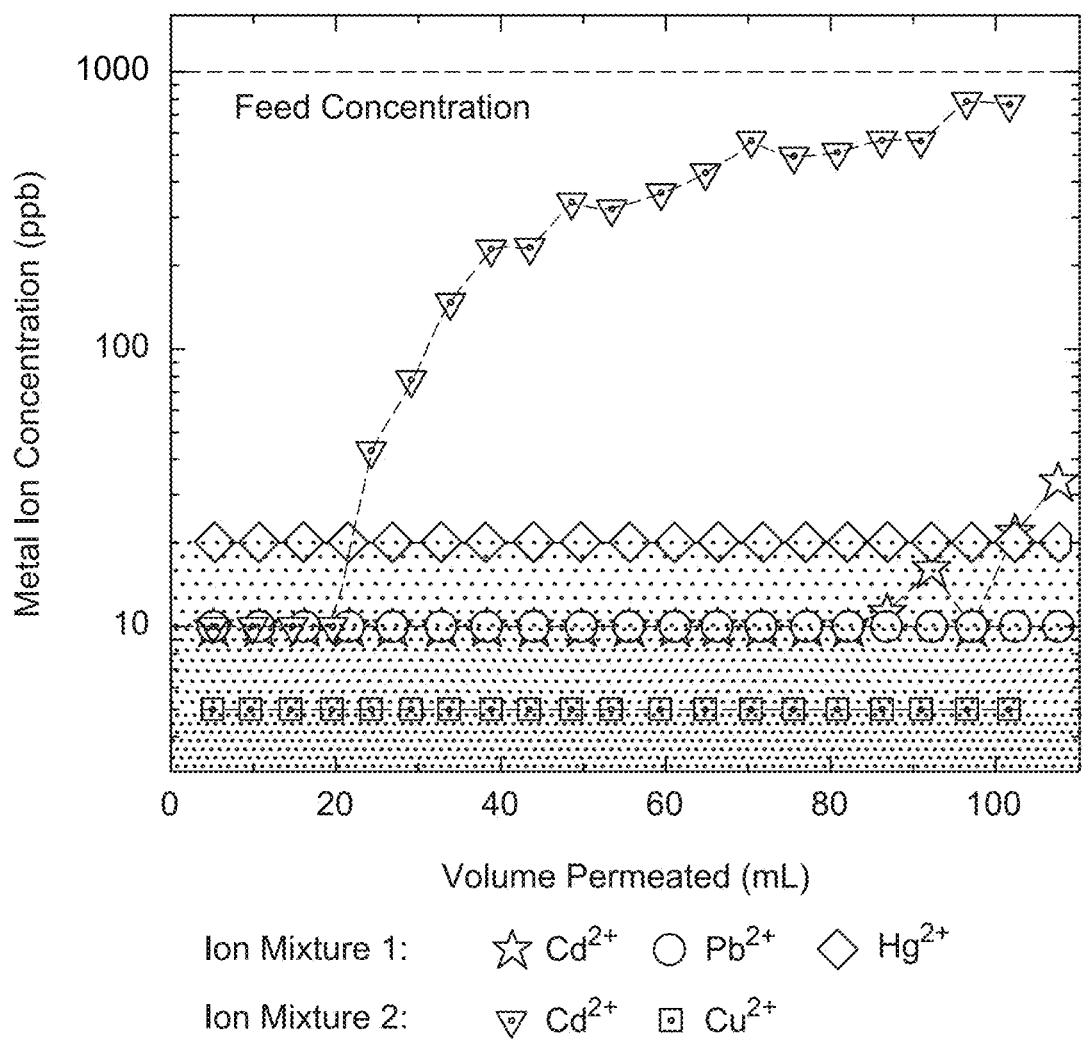
FIG. 5. Dynamic breakthrough experiments demonstrate metal ion removal in pressure-mediated flow. The concentrations of heavy metal ions in the aliquots of solution that permeated through a test bed membrane stack are plotted versus the cumulative volume of contaminated feed solution treated. The test bed consisted of one Psf-PEI membrane atop of two Psf-TerP membranes. In many instances, the concentration of heavy metal contaminants in the efflux from the test bed were below the LOQ of ICP-OES. In such cases, the ion concentration in the permeate solution were plotted at the LOQ for the various metal ions, and this region is also shaded. $Cd^{2+}$ and $Pb^{2+}$ readings below their LOQ values were adjusted up to 10 ppb, while the $Cu^{2+}$ and $Hg^{2+}$ readings were adjusted up to 5 and 20 ppb, respectively. The concentration measured by the ICP-OES is shown in FIG. 23. No dramatic breakthrough was observed for the ternary feed solution containing a mixture of $Cd^{2+}$ (star), $Pb^{2+}$ (purple circle), and $Hg^{2+}$ (rhombus) metal ions. A binary mixture of 1 ppm of $Cd^{2+}$ (triangle) and 1 ppm of $Cu^{2+}$ (square) in the feed solution demonstrates a $Cd^{2+}$ breakthrough starting at ~25 mL, while efficiently removing the incoming $Cu^{2+}$.

Dynamic Metal Ion Capture Performance. The rapid uptake kinetics demonstrated in batch adsorption experiments are consistent with the idea that diffusion from the membrane surface to unoccupied binding sites is the dominant resistance to ion capture (FIG. 17). Therefore, as demonstrated by the breakthrough curves in FIG. 5, the functionalized Psf membranes are well-suited to capture metal ions from contaminated feed solutions under dynamic flow conditions. Breakthrough curves were obtained by stacking three membranes in a stirred cell and passing heavy metal contaminated feed solutions through the stack at a volumetric flux (i.e., superficial velocity) of ~200 L m$^{-2}$ h$^{-1}$. Under these conditions, the average residence time of solution within the stack was ~5 s. Still, due to the rapid uptake kinetics, this was a sufficient period of time to reduce the concentration of metal ions from 1 ppm in the contaminated feed solutions to the single digit ppb level in the permeate solutions.

The breakthrough curves plot the concentration of metal ions in the permeate solution versus the volume of contaminated solution permeated. Two different feed solutions were utilized in these breakthrough experiments. One feed solution contained 1 ppm each of $Pb^{2+}$, $Cd^{2+}$, and $Hg^{2+}$ ions. In this instance, breakthrough of $Cd^{2+}$ initiated after 80 mL of solution had been treated, while the concentrations of $Pb^{2+}$ and $Hg^{2+}$ remained below the limit of quantification (LOQ) over the whole course of the experiment (105 mL of solution permeated). The second feed solution contained 1 ppm of $Cu^{2+}$ and 1 ppm of $Cd^{2+}$. Here, there is a sharp breakthrough of $Cd^{2+}$ starting at 25 mL of permeated solution. However, the concentration of $Cu^{2+}$ remained below the LOQ, and no breakthrough was observed over the course of the experiment. The earlier onset of $Cd^{2+}$ breakthrough in this second feed solution suggests that the incoming $Cu^{2+}$ displaces bound $Cd^{2+}$ ions due to its higher affinity for the terpyridine ligands lining the pore wall. The high affinity of the membrane stack for $Cu^{2+}$ gains support from visual comparison of the 1 ppm feed solution, which is colorless and transparent, and the clearly blue membrane surface after 100 mL of the feed solution is permeated through the membrane. This dramatic color change is consistent with the efficient heavy metal removal in the flow-through configuration that is observed in the ICP-OES analysis.

Figure 6:
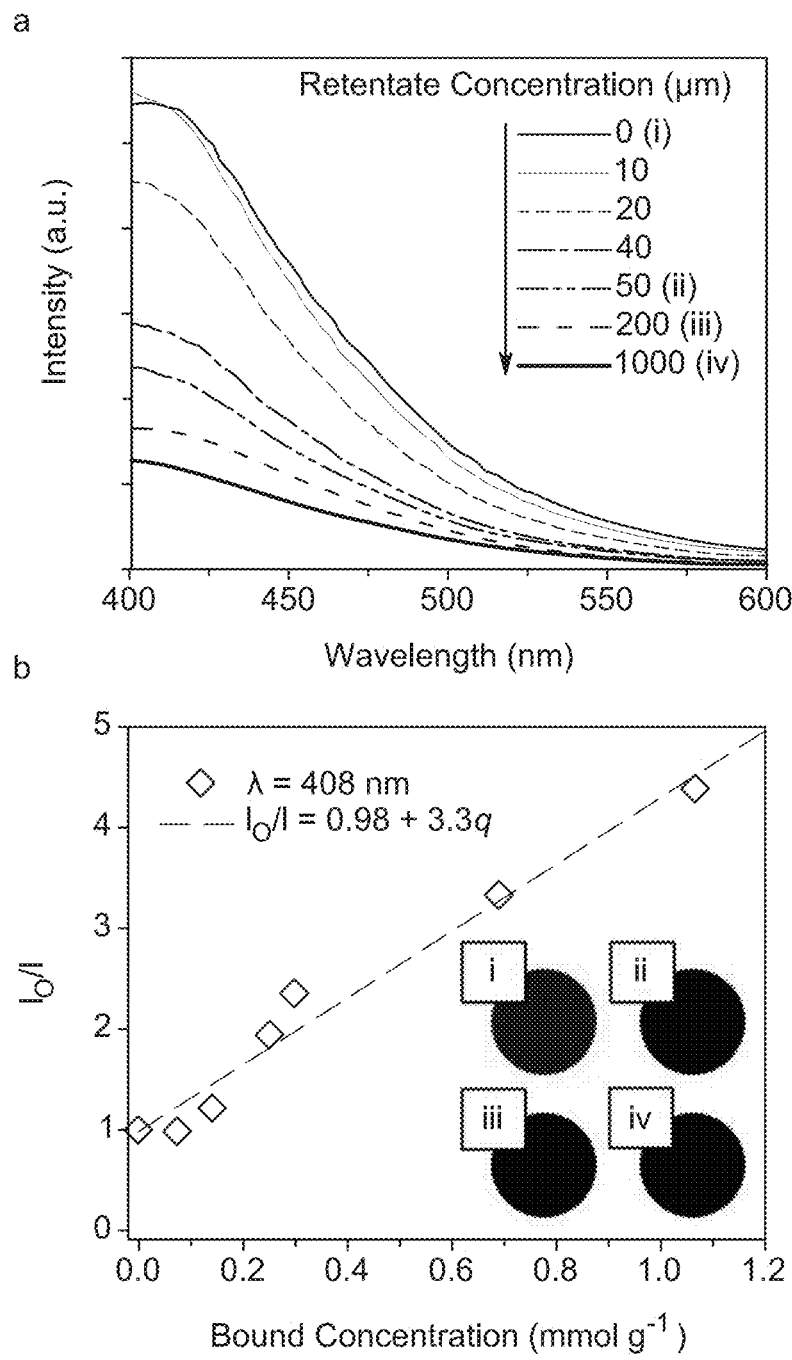
FIG. 6. The quenching of Psf-Terp membrane fluorescent intensity with increasing bound $Cu^{2+}$ concentration (q). (a) Fluorescent emission spectra ($\lambda_{ex}$=358 nm) as a function of retentate $Cu^{2+}$ concentrations. (b) The fluorescent intensity collected from emission wavelength 408 nm follows a linear relation with bound $Cu^{2+}$ concentration, suggesting the fluorescence is sensitive to the extent of $Cu^{2+}$ saturation. The representations micrographs inset shown were taken from fluorescent microscopy with background $Cu^{2+}$ concentration (i) 0, (ii) 0.05, (iii) 0.2 and (iv) 1 mM, respectively.

Psf-TerP as a Sensitive Fluorescent Probe to Detect Heavy Metal Ions. The composite membranes demonstrated efficient ion removal performance in multiple background electrolyte conditions through the attachment of higher binding affinity ligands. The manipulation of pore wall chemistry may facilitate function beyond enhanced metal binding affinity and capacity. For example, the ability of metal ions to rapidly quench the original luminescence of the TerP moiety via complexion, even at low concentrations, offers an opportunity to use the Psf-TerP membrane as a sensitive fluorescent probe to provide in-line information regarding sorbent saturation and the local concentration of heavy metal ions. This function of the Psf-TerP membrane, relying on fluorescence quenching of TerP by $Cu^{2+}$ metal ions, is demonstrated in FIG. 6. The fluorescence emission at 408 nm was significantly attenuated relative to the bare membrane fluorescence even with trace concentration of $Cu^{2+}$ of only 20 µM (1.3 ppm). This observation is supported by the fluorescent micrographs at various background $Cu^{2+}$ concentrations in FIG. 5b; the intensity of the blue fluorescence emission gradually decreased with increasing bound $Cu^{2+}$ concentration.

The variation in fluorescent intensity (I) relative to the intensity observed in a solute-free system ($I_o$) is a function of the concentration of the fluorescent quencher and can be quantified using the Stern-Volmer equation (Equation 2). In the case of the Psf-TerP membrane (FIG. 6b), the reduction in luminescence intensity, plotted as $I_o/I$, exhibits a linear relationship ($R^2$=0.97) with the concentration of bound $Cu^{2+}$ (q), which implies that bound copper is quenching the fluorescence of the TerP moieties; $K_{SV}$ is the association constant based on the concentration of bound copper.

$$\frac{I_o}{I} = 1 + K_{SV} q \quad (2)$$

Figure 24:
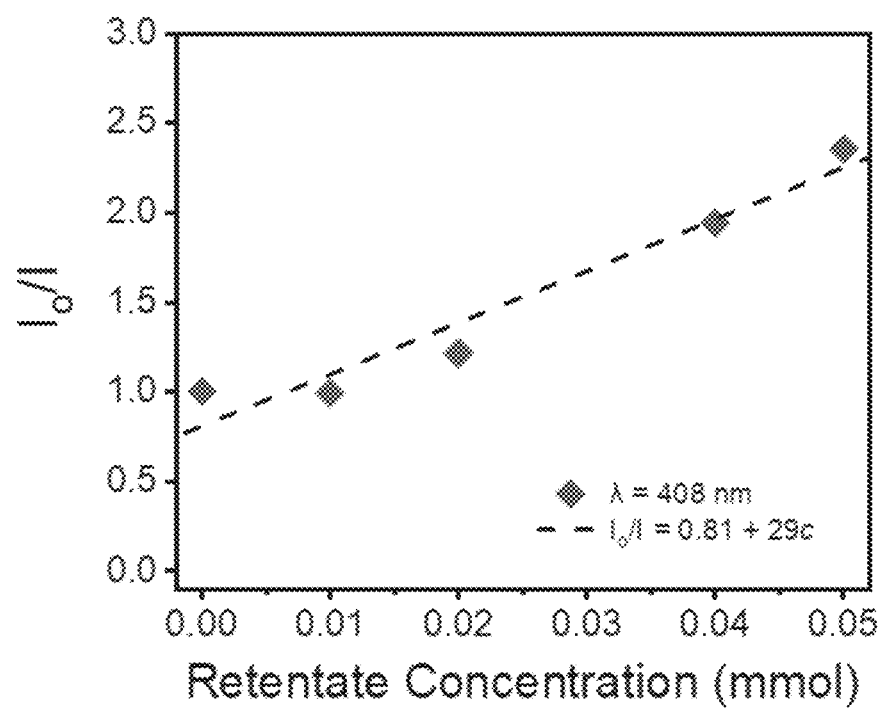
FIG. 24. A Stem-Volmer plot for terpyridine fluorescence intensity as a function of the concentration of $Cu^{2+}$ in solution. The slope of the line through the experimental data corresponds to an association constant of $2.9 \times 10^4$ L $mol^{-1}$.

As such, fluorescence detection enables facile determination of the concentration of $Cu^{2+}$ bound to the membrane. Moreover, because the binding isotherm for copper has been established above, these measurements can additionally be utilized to identify the concentration of copper in solution. The sensitivity of this detection was quantified using the quenching efficiency at low $Cu^{2+}$ concentrations where the isotherm is approximately linear (FIG. 24). In this regime, the association constant relating fluorescence quenching to the concentration of copper in solution ($K_{SV}'=K_{SV}QK$) was ~2.9×10$^4$ L mol$^{-1}$, indicates detection in the ppm range.

Detection of heavy metal ions by the Psf-TerP membrane in this concentration range is more sensitive than luminescent MOF-based sensors that utilize a Lewis base as the functional component. Taken together, the fluorescence quenching of $Cu^{2+}$ when bound to TerP-lined pore wall affords convenient and accurate heavy metal detection, and simultaneously provides a means to readily monitor the extent of sorbent saturation. The capability to execute such in situ monitoring of the sorbent saturation and metal ion concentration is an important advantage for quality control that is possible through specific design of the pore wall chemistry.

Concluding Remarks. A high flux and high capacity membrane adsorber with fully interconnected bicontinuous morphology was prepared through surface segregation and vapor induced phase separation methodology. The membrane fabrication was combined with straightforward coupling reactions to covalently introduce transition metal binding moieties on the pore walls for efficient and non-specific heavy metal adsorption. While exhibiting exceptionally high hydraulic permeabilities, the functionalized membranes provide for indiscriminate metal ion removal by sequestering a broad spectrum of 10 heavy metal ions with percent removals in excess of 95%, including in the presence of background electrolytes at a high ionic strength representative of that found in seawater. The quenching of terpyridine fluorescence observed when heavy metal ions bound to the sorbent provided an in situ monitoring strategy to quantify adsorption effectiveness and device life. Furthermore, most metal ion binding is reversible, facilitating membrane regeneration protocols. The facile modification of the pore wall chemistry using straightforward coupling reactions affords a new membrane fabrication paradigm for high performance heavy metal removal based upon the selection of ligand chemistry, with additional potential applications in biomolecular recognition, biopharmaceutical separations, or supported catalytic functions.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Fabrication of Functional Macroporous Polysulfone Membrane

All chemicals were purchased from Sigma-Aldrich and used as received unless otherwise noted. The membrane casting solution was prepared by sequentially dissolving 8.0% (by weight) polysulfone ($M_n$~ 22 kg mol$^{-1}$) and 2.0% (by weight) polystyrene-b-poly(acrylic acid) (PS-PAA) diblock copolymer in the 2-pyrrolidone (i.e., 10% total polymer content by weight in the final casting solution). The PS-PAA (Polymer Source, Inc.) has a number averaged molecular weight of $M_n$=84 kg mol$^{-1}$, a dispersity of 1.1, and weight fraction values of $w_{PS}$=0.84 and $w_{PAA}$=0.16, respectively. The solution was stirred at 40° C. until a homogeneous solution was obtained, followed by let it sit without stirring at room temperature for ~8 h, to allow the solution to degas.

Membranes were fabricated using the surface-segregation and vapor-induced phase separation (SVIPS) methodology in a humidified environment. A controlled humidity chamber with the relative humidity carefully regulated from 94% to 99% and the temperature monitored between 24° C. and 27° C. was used for membrane casting. To cast a membrane, a pre-determined amount of polymer casting solution was pipetted on top a glass substrate (Corning), and the solution was immediately drawn into a uniform thin-film via a doctor blade (Mitutoyo) set with a gate height of 305 μm. The thin film was exposed to the humid air for a predetermined amount of time prior to the opaque thin-film being immersed in the non-solvent (DI water, R=18 M Ω) bath. Subsequently, the membrane was annealed in a bath of DI water heated to 80° C. for 24 h in order to bring the poly(acrylic acid) brushes to the pore wall of the macroporous polysulfone matrix. The heat source was turned off, and the DI water bath was allowed to cool to room temperature. The membranes were then hand punched into 2.5-cm circular sections, and they were stored in the DI water bath until further functionalization, adsorption, or transport experiments were conducted.

Example 2. Synthesis of 6-(2,2':6',2''-Terpyridin-4'-yloxy) Hexanoic Acid

The synthesis of 6-(2,2':6',2''-terpyridin-4'-yloxy) hexanoic acid (TerP) was performed following a procedure (Scheme 2) reported previously in the literature (*J. Org. Chem.* 2003, 2003, 3769). Typically, powdered KOH (1.85 g, excess) was added to DMSO (10-12 mL) at 65° C. to form a suspension. ε-Caprolactone (1.49 g, 13.07 mM) was added dropwise to the stirred solution. After 30 minutes, 4'-chloro-2,2':6',2''-terpyridine (1.74 g, 6.49 mM) was added. The mixture was stirred for 48 h at 65° C. After 48 h, 400 mL of DI water was added to the reaction mixture. Concentrated HCl (1 M) was then added dropwise to the transparent solution until precipitation of a white solid was observed (pH~6). The aqueous phase was filtered using a Buchner funnel and the crude product was recrystallized in tetrahydrofuran (THF) and dried in vacuo to obtain the desired product. $^1$H nuclear magnetic resonance (1H-NMR) spectra of the TerP was acquired on a Bruker AVANCE III HD 400 spectrometer with deuterated dimethyl sulfoxide (DMSO-d$_6$) as the solvent. Mass spectrometry data was obtained using an HPLC-MS in-line system, which houses an Advion BioSciences Expression compact mass spectrometer (CMS-L) unit with electrospray negative ionization (ESI) source. The samples were measured in methanol (0.1 mg mL$^{-1}$).

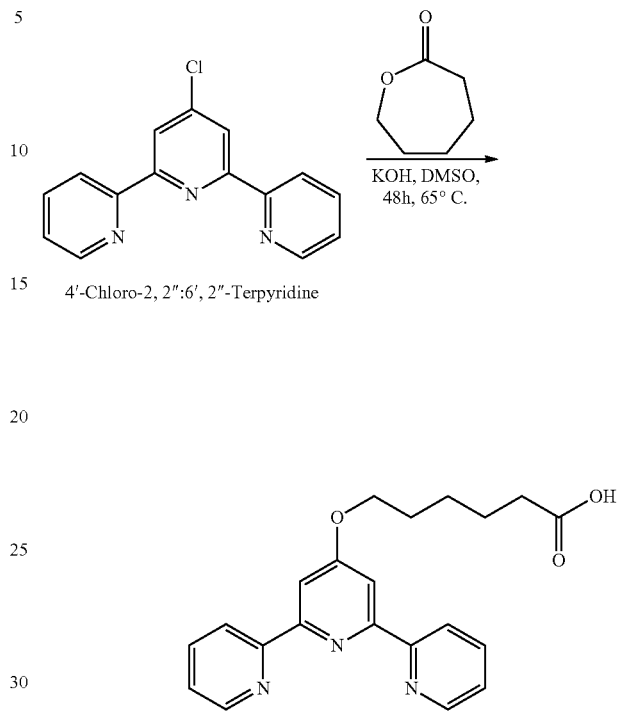

Scheme 2. The synthesis of 6-(2, 2':6', 2'''-terpyridin-4'- yloxy) hexanoic acid (TerP).

4'-Chloro-2, 2'':6', 2''-Terpyridine

Example 3. Membrane Functionalization Via Carbodiimide Coupling Reactions

The pore wall chemistry of the PAA-functionalized polysulfone membranes was further modified via solid-state coupling reactions following previously-reported protocols using 1-ethyl-3-(3-dimethylaminopropyl) carbodiimide hydrochloride (EDC HCl) as the carboxyl activating agent. Through the use of this simple reaction methodology, branched polyethylenimine (PEI) and 6-([2,2':6',2''-terpyridin]-4'-yloxy) hexanoic acid (terpyridine, TerP) were sequentially attached onto the pore wall (Scheme 3). The carbodiimide coupling reaction that converted the pore wall chemistry from poly(acrylic acid) to branched polyethylenimine was carried out by immersing pieces of a poly(acrylic acid) functionalized polysulfone membrane into an aqueous solution containing 5 mM polyethylenimine ($M_n$~ 60 kg mol$^{-1}$), 50 mM EDC HCl (Chem-Impex International, Inc.), 250 mM hydroxybenzotriazole (HOBt), and 100 mM NaHCO$_3$. The 60 kg mol$^{-1}$ branched polyethylenimine was selected for the functionalization process because its hydrated size is much smaller than the pore size of the Psf-PAA membrane. The solution pH was monitored by using an Accumet AP115 portable pH meter (Fisher scientific, Waltham, MA), and the pH was adjusted by diluting hydrochloric acid (HCl) in the solution until a neutral pH was achieved. The mixture was then covered and left to react at room temperature for 4 days, followed by removing the membrane from solution and rinsing it thoroughly with DI water.

Scheme 3. The full synthesis utilized to the convert the pore wall chemistry from (i) PAA brushes to (ii) a PEI intermediate and finally (iii) the TerP-functionalized brushes. The chemical bonds labeled by the Roman numerals are associated with characteristic peaks that are highlighted in Figure 10.

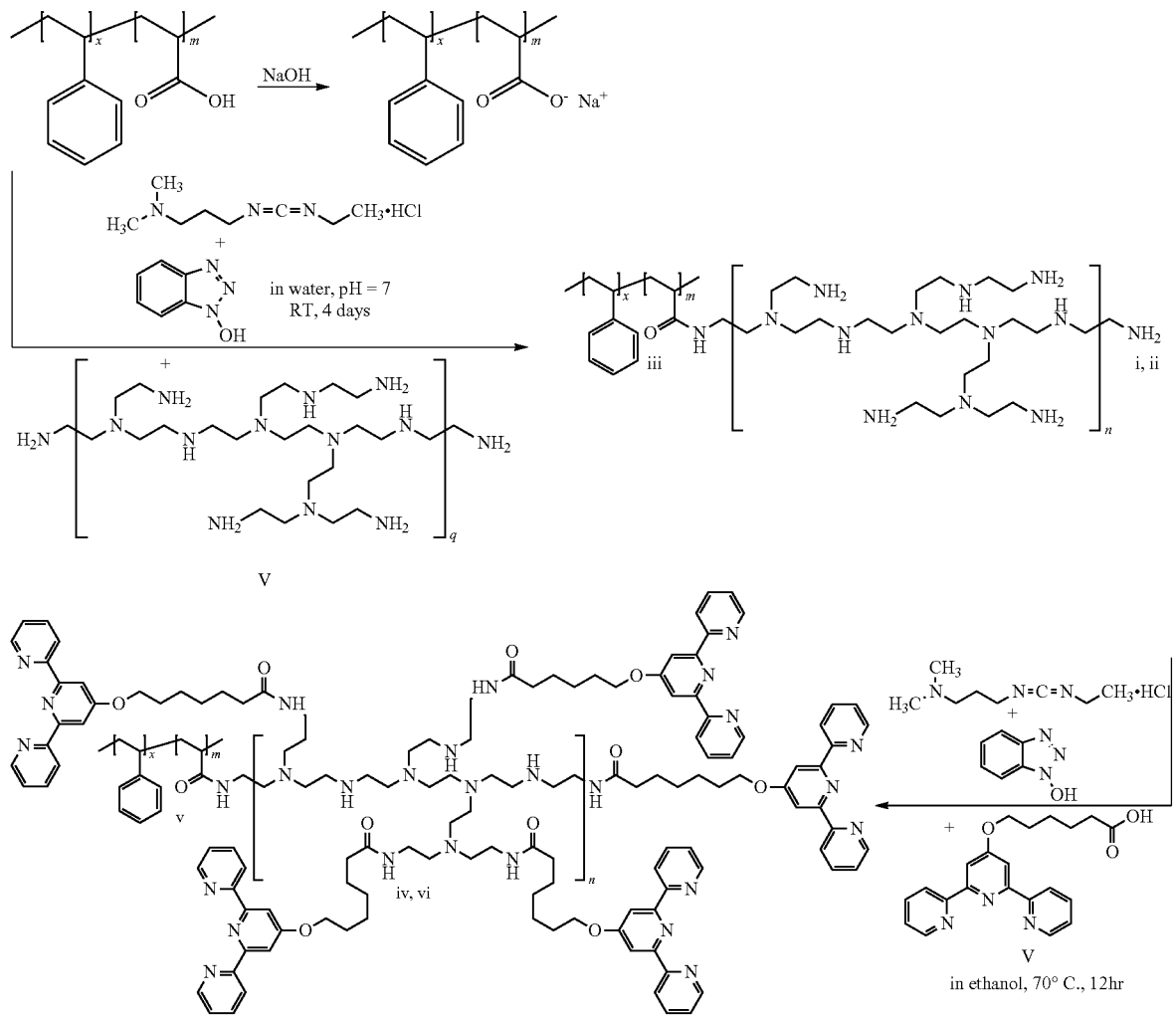

In this manner, the PEI functionalized membrane was ready for the further covalent attachment of the terpyridine chemistry. The conversion of branched PEI lined pore wall chemistry into terpyridine follows a similar carbodiimide coupling reaction protocol using the EDC HCl as the carboxyl activating agent. Specifically, PEI functionalized membranes were submerged in an ethanol solution containing 25 mM terpyridine, 10 mM EDC.HCl and 25 mM HOBt in a 150 mL pressure vessel (Chemglass). The solution was heated to 70° C. for 12 h followed by cooling the solution to room temperature, prior to removing the membrane from the vessel and rinsing thoroughly with DI water. Both the branched PEI and terpyridine functionalized membranes were stored in DI water baths before they were further utilized in the static cation adsorption and transport experiments.

Example 4. Nanostructural and Chemical Characterization

A Magellan 400 (FEI) Digital Field Emission Scanning Electron Microscope (FE-SEM) was utilized to characterize the nanoscale morphology of the various membranes. For membrane surface characterization, samples of vacuum-dried membranes were cut into 5.0 mm×5.0 mm pieces from larger sheets using a razor blade. Samples for cross-sectional imaging analysis were prepared by fracturing after submerging the membranes in a bath of liquid nitrogen for ~30 s. Subsequently, sample pieces were mounted on standard aluminum SEM pin stubs (Ted Pella, Inc.) using conductive carbon tape and were sputter-coated with ~1.5 nm of iridium prior to loading the samples into the microscope. Micrographs were captured at a working distance of 4.0 mm, with accelerating voltages ranging from 5 to 10 kV and beam current ranging from 6.3 to 13 pA.

The chemical compositions of the membranes were analyzed by using a Jasco Fourier Transform Infrared (FT/IR-6300) spectrometer equipped with an interchangeable attenuated total reflectance (ATR) crystal plate. Prior to analysis, pieces of membrane samples were vacuumed-dried and stored in a clean scintillation vial. The ATR-FT/IR spectra was collected over a range of $650.0 \leq v \leq 4{,}000$ cm$^{-1}$. The surface elemental analysis was performed by using a PHI VersaProbe II X-Ray Photoelectron Spectrometer (XPS). Membrane samples were mounted on a stub by using double sided tape and were loaded into the XPS chamber under ultra-high vacuum ($1\times10^{-8}$ torr) for photoelectron spectrum collection. The binding energy of the C is shell of amorphous carbon (284.5 eV) was utilized as a reference during the measurement of each sample to account for charging. The surface elemental compositions were determined through the use of a numerical integration routine in the Phi Multipak software package. The nitrogen (N) to oxygen (O) ratio was then calculated based on the elemental composition corresponding to each membrane sample.

Example 5. Cation Adsorption Experiments for Heavy Metal Binding Assessment

The static equilibrium cation adsorption experiments of functionalized polysulfone membranes were performed based on membranes that were hand-punched into 2.5-cm circular sections. The cation binding isotherms were assessed using cupric chloride ($CuCl_2$) as a model solute. For PAA- and PEI-functionalized membranes, pieces of membranes were immersed in aqueous sodium hydroxide solutions (pH=13) for ~8 h and rinsed with excess DI water for ~15 minutes prior to cation binding experiments. In this manner, the deprotonated carboxylic acid and ethylenimine chemistries were ready for subsequent cation adsorption experiment. The membranes were then submerged in excess amount of $CuCl_2$ solution (i.e., by immersing a piece of membrane that weight ~0.01 g in a bath of $CuCl_2$ solution at <0.20 g of membrane per liter of cupric chloride solution) at concentrations between 1 and 150 mM (64 to $9.5\times10^3$ ppm) for ~8 h, and were subsequently rinsed with excess DI water for ~15 minutes to remove free and loosely bound copper ions remaining within the membrane structure. To completely release bound cations, copper containing membranes were relocated into separate scintillation vials containing 5 ml diluted hydrochloric acid (pH=1) for ~8 h. The dilute hydrochloric acid solutions containing copper ions were stored to be analyzed by a Cary 60 ultraviolet-visible (UV-Vis) spectrophotometer that calculates the concentration of copper ions samples using Beer's Law, with the maximum in the absorbance for the copper (II) at $\lambda=830$ nm.

To characterize the binding isotherm of the terpyridine functionalized membranes, samples were immersed in $CuCl_2$ solutions at concentrations between 0.1 and 1.0 mM (6.3 to 63 ppm) for ~8 h, with a packing ratio of 0.25 g membrane $L^{-1}$. Following the copper binding experiment, membranes were rinsed with DI water thoroughly for ~15 minutes to remove free and loosely bound copper, and then were transferred into individual scintillation vials containing 50 mM ethylenediaminetetraacetic acid (EDTA) solution for ~8 h. The copper releasing experiments for $Cu^{2+}$ bounded terpyridine-functionalized membranes were performed based on a packing ratio of 1.3 g membrane per liter of EDTA solution. The copper ion sequestered EDTA solution and the retentate solutions were analyzed via a Perkin Elmer Optima 8000 Inductively Coupled Plasma Optically Emitting Spectra (ICP-OES) to quantify the equilibrium cation concentration. Membranes were repeatedly regenerated and reused to collect adsorption experimental data.

The adsorption kinetics of the terpyridine-functionalized polysulfone membranes was assessed using a similar approach as followed in the isotherm study. To start with, pieces of 2.5-cm diameter circular sample disks were immersed into excess $CuCl_2$ solution (i.e., with a packing ratio >0.1 g membrane $L^{-1}$) at a concentration of 10 mM. The membranes were submerged in the solution for a pre-determined amount of time ranging from 20 to 600 s prior they were rinsed thoroughly with excess DI water. The membranes bound with copper were then transferred into the same scintillation vials containing 50 mM EDTA solution for ~8 h, and the retentate solutions were analyzed by using the same ICP-OES protocol.

The adsorption experiments that analyzed static metal ion binding in the presence of multiple background electrolytes and the additional single solute metal ion adsorption experiments were performed in a similar manner as the binding-isotherm experiments detailed above. In the experiments examining the effects of multiple background electrolytes adsorption experiment, 6 and 18 ppm $Pb^{2+}$ and $Cd^{2+}$ stock solutions were prepared by dissolving $Pb(NO_3)_2$ and $CdCl_2$ in DI water (R=18 M Q), artificial ground water (composed by 0.40 mM $Mg^{2+}$, 1.3 mM $Ca^{2+}$, 17 mM $Na^+$, 0.25 mM $K^+$, 0.52 mM $SO_4^{2-}$, 1.7 mM $CO_3^{2-}$ and 5.7 mM $Cl^-$) and artificial sea water (composed by 54.5 mM $Mg^{2+}$, 10.5 mM $Ca^{2+}$, 480 mM $Na^+$, 10.2 mM $K^+$, 30.0 mM $SO_4^{2-}$, 2.36 mM $HCO_3^-$ and 561 mM $Cl^-$), respectively. In the single solute adsorption experiment, metal ion solutions were prepared by dissolving 18 ppm cation within DI water. A total number of 8 cations $Co^{2+}$ ($CoCl_2$), $Fe^{2+}$ ($FeCl_2$), $Hg^{2+}$ ($HgCl_2$), $Ni^{2+}$ ($NiCl_2$), $Pd^{2+}$ ($PdCl_2$), $Nd^{3+}$ ($Nd(NO_3)_3$), $Sm^{3+}$ ($Sm(NO_3)_3$) and $Zn^{2+}$ ($ZnCl_2$) were screened in addition to $Cd^{2+}$, $Pb^{2+}$ and $Cu^{2+}$. $PdCl_2$ was dissolved in dilute acid with solution pH monitored at pH=1 to enhance $Pd^{2+}$ solubility. To start, PAA-functionalized, PEI-functionalized, and terpyridine-functionalized membranes were immersed in cation stock solutions based on a packing ratio of 2.0 g membrane $L^{-1}$ for ~8 h. After removing the membrane samples, the retentate solutions were analyzed by ICP-OES to determine the residual cation concentrations. Heavy metal bonded membranes were repeatedly regenerated by using diluted hydrochloric acid or EDTA solution for further cation binding experiments, expect PEI and TerP-lined membranes bound with $Co^{2+}$ did not show release despite the presence of external stimuli.

Example 6. Hydraulic Permeability Characterization Based on Stirred Cell Experiments The 2.5 cm polysulfone membrane disks were assembled into a 10 ml stirred cell (EMD Millipore Amicon 8010) with surface layer facing the feed solution atop of a 2.5 cm PP/PE nonwoven support. Because the membranes have high hydraulic permeability that depleted the 10 ml stirred cell within seconds even at lower trans-membrane pressures (i.e., <0.2 bar), the stirred cell was connected to an 800 mL stirred reservoir (EMD Millipore, Amicon 6028) to increase the capacity of feeding reservoir for continuous flow-through experiments. The stirred cell system was filled with DI water (R=18 M Q) with pH~5.5 during hydraulic permeability assessment experiments. During the pH-responsive permeability experiment of PAA-functionalized polysulfone membranes, pH-adjusted solutions were prepared by diluting hydrochloric acid or dissolving sodium hydroxide in the DI water to prepared acidic (pH=1) or basic (pH=13) solutions, respectively. Solution pH was carefully monitored using an AP115 portable pH meter. A carefully regulated trans-membrane pressure ranging from 0.010 to 0.12 bar was applied using compressed nitrogen gas. The permeate solution was collected in a capped glass container that rested on an electronic balance, and the mass of permeate was recorded electronically every 3 s for up to 5 min to acquire a stable and accurate measurements of the flux through the membranes. Subsequently, the hydraulic permeabilities were determined using linear regressions based on the water flux acquired from multiple trans-membrane pressures.

The heavy metal breakthrough experiments were executed using a test bed comprised of three membranes stacked inside a stirred cell device. The test bed was prepared by stacking a Psf-PEI membrane on top of two Psf-TerP membranes. Due to the lower hydraulic permeability of the Psf-PEI membrane, this configuration provided better control over the rate of the pressure mediated flow. A trans-membrane pressure ranging from ~0.2 to 0.3 bar was applied using compressed nitrogen gas to generate a permeate flux of ~200 L m-2 h-1. $CdCl_2$, $PbCl_2$, $HgCl_2$, and $CuCl_2$ salts were used to prepare the mixed ion feed solutions. All feed solutions were formulated to contain the individual metal ions ($Cd^{2+}$, $Pb^{2+}$, $Hg^{2+}$, and $Cu^{2+}$) dissolved in DI water (R=18 M Ω) at a concentration of 1 ppm. One feed solution contained 1 ppm each of $Cd^{2+}$, $Pb^{2+}$, and $Hg^{2+}$ and the other feed solution contained $Cd^{2+}$ and $Cu^{2+}$ at 1 ppm. The ion concentrations within the permeate solutions, which were collected at ~5 mL intervals, were analyzed by ICP-OES.

Example 7. Fluorescence Quenching Experiments

TerP-modified membranes were cut into pieces of 2.0 mm×2.0 mm from larger sheets using a razor blade and were exposed to $Cu^{2+}$ at different retentate solution concentrations. Membranes were rinsed thoroughly with DI water and transferred to a 24-well plate using forceps. Fluorescent images were captured using an EVOS-Auto-FL microscope with illumination from a DAPI (blue fluorescence) light cube and corresponding emission filters. All acquisition parameters were maintained constant across images. The resulting gray-scale images were processed by background subtraction using ImageJ and false-colored blue to reflect the wavelength of emitted light. Fluorescence emission spectra from these same samples as were imaged was then collected between 386 to 600 nm using a multi-modal plate reader (Infinite M200 Pro, Tecan) with an excitation wavelength of 358 nm.

Example 8. Calculation for Hydraulic Permeability of Functionalized Psf Membranes The pH-responsive hydraulic permeability of the Psf-PAA membranes is consistent with scaling analysis in the low Reynolds number limit. In this limit, the hydraulic permeability depends on the effective pore diameter to the fourth power, $d_p^4$. Analysis of the SEM micrographs of the membrane reveal a pore diameter on the order of ~500 nm. As depicted schematically in FIG. 9, the extension of the PAA brushes on the pore walls constricts the pore diameter to a smaller value. There are $N_{PAA}$~180 repeat units in a PAA brush with a molecular weight of 13 kg mol$^{-1}$. This corresponds to a brush length of ~38 nm assuming a charged polymer brush extend as rigid rod within good solvent $$L_{PAA}=N^{0.8}b=38.2 \text{ nm} \qquad (3)$$

where b is the statistical segment length of PAA (~0.6 nm). In this instance, the permeability should be reduced by a factor of $(423.5/500)^4=0.51$ at high pH values when the PAA brushes extend. Given the approximate nature of this estimate, this is consistent with the ratio of the permeabilities observed experimentally at a value of 0.56.

In addition to impacting the metal capture characteristics of the membranes, the repeat unit chemistry directly impacts the configuration of the polymer brushes on the pore walls, and hence, the hydraulic permeabilities values of the membranes. These variations in permeability with the varied pore chemistries are demonstrated in FIG. 17. The permeability values were calculated from the water fluxes measured as a function of applied pressure (FIG. 8). The incorporation of branched PEI, which possesses a large hydrodynamic diameter, constricts the pore size and reduces the porosity relative to the Psf-PAA membrane, and both of these factors contribute to a more than one order of magnitude decline in hydraulic permeability.

Compared to the Psf-PAA membranes that had a permeability of $2.5\times10^4$ L m$^{-2}$ h$^{-1}$ bar$^{-1}$, the Psf-PEI membranes had a permeability of $1.8\times10^3$ L m$^{-2}$ h$^{-1}$ bar$^{-1}$. However, the attachment of the more hydrophobic TerP moieties, which hinders the extension of the polymer brushes, increased the effective pore size and thus a large hydraulic permeability value of ~$2.8\times10^4$ L m$^{-2}$ h$^{-1}$ bar$^{-1}$, similar to that of the original PAA-lined template, was recovered. In this manner, a high-performance adsorption membrane is prepared, with high cation binding capacity and affinity and an extremely high hydraulic permeability.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A composite membrane comprising a polysulfone (Psf) and a polystyrene-b-poly(acryloyl) diblock copolymer (PS-PAX), wherein the acryloyl group of the poly(acryloyl) moiety has an amide bond to a branched polyethylenimine of Formula II:

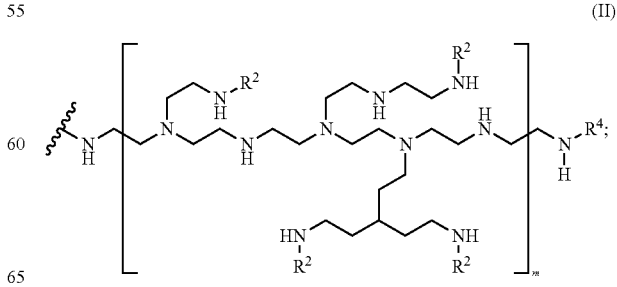

wherein
R² is —C(=O)R³;
R³ is a tethered nitrogen heterocycle of Formula III:

(III)

wherein
R⁵ is H, halo, OH, NH₂, alkyl, alkoxy, or alkylamino; and
n is 1-10;
R⁴ is H or —C(=O)R³; and
m is 10-1000;
wherein the weight ratio of Psf to PS-PAX is greater than 2 to 1 and less than 6 to 1;
  wherein the membrane has a network of interconnecting pores and pore openings at the surface of the membrane, the pores comprise polymer chains extending from the inner surface of the pores into the lumen of the pores, the chains comprise a segregated poly(acryloyl) moiety of the diblock copolymer, and the segregated poly(acryloyl) moiety comprises a plurality of metal ion binding groups of Formulas II and III; and
  wherein the diameters of the pore openings are less than about 5000 nm and the membrane has a metal ion maximum binding capacity (Q) of at least 0.4 mmol/g.

2. The composite membrane of claim 1 wherein n is 5 or 6.

3. The composite membrane of claim 1 wherein the weight ratio of Psf to PS-PAX is about 4 to 1.

4. The composite membrane of claim 1 wherein Q is about 0.4 mmol/g to about 5 mmol/g.

5. The composite membrane of claim 1 wherein the diameter of pore openings at the surface of the membrane is about 100 nm to about 2000 nm, and the chains extend from the inner surface of the pores into the lumen of the pores and pore openings.

6. The composite membrane of claim 1 wherein the number averaged molecular weight ($M_n$) of Psf is about 15 kg mol⁻¹ to about 150 kg mol⁻¹ and the $M_n$ of PS-PAX is about 20 kg mol⁻¹ to about 100 kg mol⁻¹.

7. The composite membrane of claim 1 wherein PS-PAX has a polystyrene weight fraction ($w_{PS}$) of about 0.70 to about 0.95 and a poly(acryloyl) weight fraction ($w_{PAX}$) of about 0.05 to about 0.30.

8. The composite membrane of claim 1 wherein the PS-PAX diblock copolymer comprises Formula I:

(I)

wherein
X is the branched polyethylenimine of Formula II;
R¹ is H, halo, OH, NH₂, alkyl, alkoxy, or alkylamino;
y is 10-1000; and
z is 10-1000.

9. A composite membrane comprising a polysulfone (Psf) and a polystyrene-b-poly(acryloyl) diblock copolymer (PS-PAX) of Formula I:

(I)

wherein
R¹ is H, halo, OH, NH₂, alkyl, alkoxy, or alkylamino;
y is 10-1000;
z is 10-1000; and
X is a branched polyethylenimine of Formula II:

(II)

wherein
R² is —C(=O)R³;
R³ is a tethered nitrogen heterocycle of Formula III:

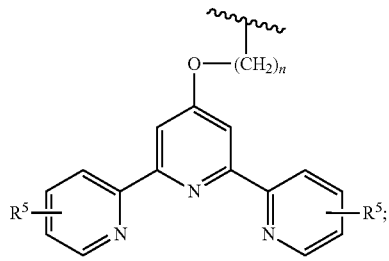

(III)

wherein
R⁵ is H, halo, OH, NH₂, alkyl, alkoxy, or alkylamino; and
n is 1-10;

R⁴ is H or —C(=O)R³;
m is 10-1000;
wherein the weight ratio of Psf to PS-PAX is greater than 2 to 1 and less than 6 to 1;
wherein the membrane has a network of interconnecting pores and pore openings at the surface of the membrane, the pores comprise polymer chains extending from the inner surface of the pores into the lumen of the pores, the chains comprise a segregated poly(acryloyl) moiety of the diblock copolymer, and the segregated poly(acryloyl) moiety comprises a plurality of metal ion binding groups of Formulas II and III that are capable of binding metal ions from wastewater; and
wherein the diameters of the pore openings are less than about 5000 nm and the membrane has a metal ion maximum binding capacity (Q) of at least 0.4 mmol/g.

10. The composite membrane of claim 9 wherein n is 5 or 6.

* * * * *